US010196996B2

(12) United States Patent
Dudar

(10) Patent No.: US 10,196,996 B2
(45) Date of Patent: Feb. 5, 2019

(54) METHODS AND SYSTEMS FOR DIAGNOSING AN ENGINE INTAKE HUMIDITY SENSOR

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 41 days.

(21) Appl. No.: 15/644,419

(22) Filed: Jul. 7, 2017

(65) Prior Publication Data

US 2019/0010885 A1 Jan. 10, 2019

(51) Int. Cl.
*B60W 10/06* (2006.01)
*B60W 10/22* (2006.01)
*B60W 20/40* (2016.01)
*F02D 41/00* (2006.01)
*F02D 41/04* (2006.01)
(Continued)

(52) U.S. Cl.
CPC .......... *F02D 41/042* (2013.01); *B60W 10/06* (2013.01); *B60W 10/22* (2013.01); *B60W 20/40* (2013.01); *F02D 41/0065* (2013.01); *F02D 41/222* (2013.01); *F02M 26/46* (2016.02); *B60W 2710/22* (2013.01); *F02D 2041/228* (2013.01); *Y10S 903/93* (2013.01)

(58) Field of Classification Search
CPC .. F02D 41/042; F02D 41/0065; F02D 41/222; F02M 26/46; B60W 10/06; B60W 10/22; B60W 20/40; B60W 2710/22; B60W 2041/228; Y10S 903/93
See application file for complete search history.

(56) References Cited

U.S. PATENT DOCUMENTS

| 5,036,802 A | 8/1991 | D'Amours |
| 6,237,546 B1 | 5/2001 | Gander |

(Continued)

FOREIGN PATENT DOCUMENTS

EP 1574692 A1 9/2005

OTHER PUBLICATIONS

"Ford Employees on Pace to Set Record for Inventions in 2016," Ford Motor Company Press Release, Available Online at https://media.ford.com/content/fordmedia/fna/us/en/news/2016/09/20/ford-employees-record-inventions-2016.html, Sep. 20, 2016, 4 pages.
(Continued)

*Primary Examiner* — Nicholas Kiswanto
(74) *Attorney, Agent, or Firm* — Julia Voutyras; McCoy Russell LLP

(57) ABSTRACT

Methods and systems are provided for a diagnostic of a humidity sensor positioned in an intake of an engine and adjusting engine operation responsive to findings of the diagnostic. In one example, the method may include sealing a vehicle exhaust system of an engine, combusting fuel at cylinders of the engine while flowing gases through the engine in a first direction, and then, flowing the combusted exhaust gases through the engine in a reverse, second direction to the humidity sensor positioned in the intake. The method may further include indicating degradation of the humidity sensor based on the output of the humidity sensor while flowing gases in the first and second directions.

20 Claims, 6 Drawing Sheets

(51) Int. Cl.
*F02D 41/22* (2006.01)
*F02M 26/46* (2016.01)

(56) References Cited

U.S. PATENT DOCUMENTS

| | | | |
|---|---|---|---|
| 6,581,370 B2 * | 6/2003 | Sato | F01N 3/0835 |
| | | | 123/688 |
| 6,772,586 B2 | 8/2004 | Miyahara et al. | |
| 7,318,409 B2 | 1/2008 | Cullen | |
| 7,543,564 B2 | 6/2009 | Holm et al. | |
| 8,315,759 B2 | 11/2012 | Bauerle | |
| 9,163,588 B2 | 10/2015 | Sumilla et al. | |
| 9,329,160 B2 | 5/2016 | Pursifull et al. | |
| 9,382,861 B2 * | 7/2016 | Jankovic | F02D 41/144 |
| 9,389,198 B2 | 7/2016 | Pursifull et al. | |
| 9,482,172 B2 * | 11/2016 | Pursifull | F02D 41/005 |
| 9,803,590 B2 * | 10/2017 | Pursifull | F02M 25/0221 |
| 2003/0106304 A1 * | 6/2003 | Miyahara | F02D 41/222 |
| | | | 60/277 |
| 2007/0181111 A1 * | 8/2007 | Cullen | F02D 41/021 |
| | | | 123/677 |
| 2009/0182489 A1 | 7/2009 | Yang et al. | |
| 2013/0174644 A1 | 7/2013 | Schneider et al. | |
| 2014/0316672 A1 | 10/2014 | Uhrich et al. | |
| 2016/0083936 A1 | 3/2016 | Martin et al. | |
| 2016/0265458 A1 * | 9/2016 | Okada | F02D 41/0065 |
| 2017/0198666 A1 * | 7/2017 | Ito | F02D 41/222 |
| 2017/0268451 A1 * | 9/2017 | Pursifull | F02D 35/028 |

OTHER PUBLICATIONS

Dudar, A., "Method and System for a Humidity Sensor in a Vehicle," U.S. Appl. No. 15/474,386, filed Mar. 30, 2017, 23 pages.

\* cited by examiner

METHODS AND SYSTEMS FOR DIAGNOSING AN ENGINE INTAKE HUMIDITY SENSOR

FIELD

The present description relates generally to methods and systems for controlling a vehicle engine to diagnose functionality of a humidity sensor disposed in an intake of the vehicle engine.

BACKGROUND/SUMMARY

Engine systems may use humidity sensors to monitor ambient humidity levels in order characterize engine operating conditions and appropriately control engine parameters such as fuel injection, valve and ignition timing, and boost pressure to increase performance and fuel efficiency and reduce emissions. Some engine systems may also rely on the output of a humidity sensor positioned in an intake manifold to control exhaust gas recirculation (EGR) from an engine exhaust system to an engine intake system, to reduce emissions, among other purposes. In one example, in addition to adjusting EGR based on engine speed and engine load, these humidity sensors may also provide input data for controlling an EGR valve to adjust the amount of recirculated exhaust gas flow and achieve a desired intake air dilution based on engine operating conditions, thus maintaining desirable combustion stability. Recirculated, and in some instances, cooled exhaust gas may be combined with fresh intake air drawn into the intake passage resulting in a mixture of fresh intake air and recirculated exhaust gas entering the engine. Thus, an estimate of EGR flow may be determined based on an output of the humidity sensor positioned in the intake or intake manifold, and therefore be used to control EGR flow to a desired level based on additional engine operating conditions. If the humidity sensor is not functioning correctly, an inaccurate EGR flow estimate may be determined, thereby resulting in controlling the EGR flow rate to a rate different than desired, which may result in increased emissions and/or reduced engine performance.

Because humidity sensor output data affects engine performance, fuel efficiency, and emissions, a robust intake manifold humidity sensor diagnostic is needed. Other attempts to provide an intake manifold humidity sensor diagnostic include using a condensation heater and temperature sensor coupled to the humidity sensor to increase the local temperature and thus the corresponding humidity proximate the humidity sensor to invoke a humidity sensor response. One example approach is shown by Pursifull, et al. in U.S. Pat. No. 9,329,160. Therein, Pursifull aims to model the relative humidity as a function of pressure and temperature for a given absolute humidity. By comparing the modeled output of the humidity sensor to the actual output of the humidity sensor responsive to actuation of the condensation heater, degradation may be determined if the difference between the modeled output and the actual output surpasses a margin of error threshold.

Other attempts to provide robust methods for diagnosing an intake manifold humidity sensor include selectively diagnosing a fault in the humidity sensor based on a comparison between a first humidity value from a humidity sensor in the intake manifold and a second humidity value based on humidity data from another source. One example approach is shown by Bauerle in U.S. Pat. No. 8,315,759. Therein, Bauerle demonstrates receiving a signal from a data source external to the vehicle, such as a wi-fi or television signal to determine a baseline indication of ambient humidity. Other example approaches include comparing the output of a humidity sensor positioned in the intake manifold to the output of a humidity sensor positioned in a passenger compartment of the vehicle, or to an estimation of humidity based on an oxygen sensor positioned in an exhaust passage of the engine.

However, the inventors herein have recognized potential issues with such systems. As one example, coupling a condensation heater and a temperature sensor to a humidity sensor for the purpose of verifying the humidity sensor's functionality increases the cost of production and the number of components to be housed in an engine compartment where space is already in short supply. Further, the method relies on affecting humidity sensor output using the condensation heater, and modeling humidity sensor data based on output from the temperature sensor, both of which may themselves suffer degradation. In other examples, rationalizing humidity sensor functionality against a separate and/or distant humidity sensor may lead to error as the humidity may be different at the respective sensor locations, making comparison of sensor output moot. Additionally, many noise factors exist which may cause incorrect diagnoses when comparing two different sensor outputs. In the example of using an oxygen sensor in the exhaust system to estimate humidity, incomplete combustion, the temperature of the exhaust, and intake manifold leaks may skew sensor output and give a faulty reading. Furthermore, some engines, such as start/stop engine and PHEVs may have limited engine run time, and using downstream sensors to diagnose humidity sensor function may not present sufficient opportunities for diagnosis. Lastly, some regions are naturally dry and arid, which may not readily provide the humid conditions suitable for regular evaluation of the humidity sensor.

In one example, the issues described above may be addressed by a method for an engine, comprising: after an engine-off duration: combusting fuel at cylinders of the engine while flowing gases through the engine in a first direction; switching to flowing gases through the engine in an opposite, second direction while not combusting fuel; during the flowing gases in the second direction, obtaining an output of a humidity sensor positioned in an engine intake; and indicating degradation of the humidity sensor based on the output. In this way, an increased and/or known quantity of water vapor generated by combustion may be drawn from the exhaust, through the combustion chambers, and past the humidity sensor positioned in the intake manifold of the engine. By introducing an increased and/or known quantity of water vapor, a given humidity sensor response may be expected.

As one example, degradation of the humidity sensor may be indicated responsive to the output of the humidity sensor not changing by a threshold amount between flowing gases through the engine in the first direction and flowing gases through the engine in the opposite, second direction. Further, in response to indicating degradation, subsequent engine operation may not be based on the output of the humidity sensor (e.g., EGR flow may not be estimated and/or controlled based on the output of the degraded humidity sensor). In this way, by monitoring the humidity sensor response while flowing gases through the engine in the first (e.g., forward) and then second (e.g., reversed) directions, an expected humidity sensor response may be characterized, and degradation may be diagnosed without relying on remote humidity sensor indications, or the use of supplemental heaters and temperature sensors.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
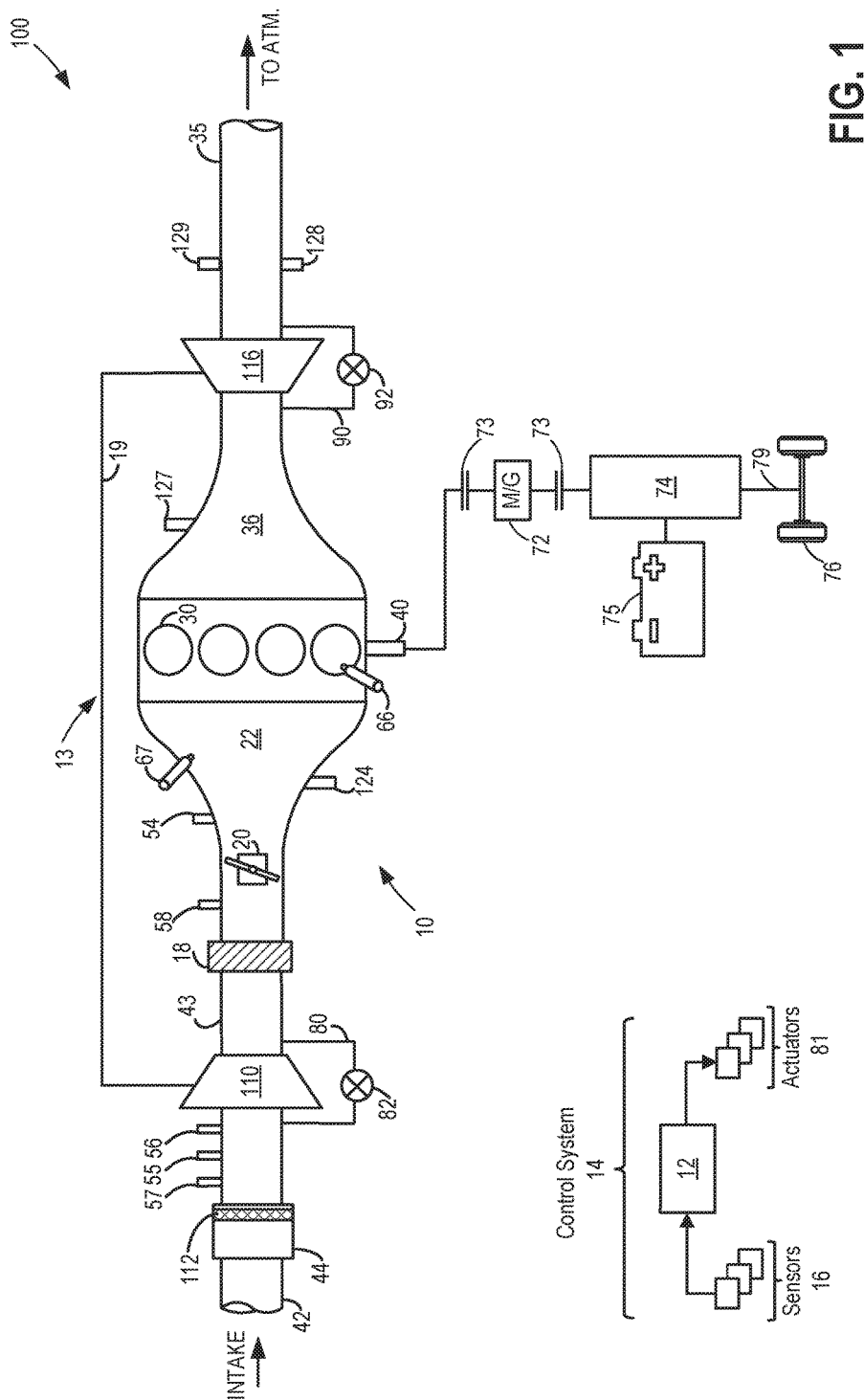
FIG. 1 shows an example embodiment of a vehicle system that includes a humidity sensor disposed in an intake of an engine of the vehicle system.
Figure 2:
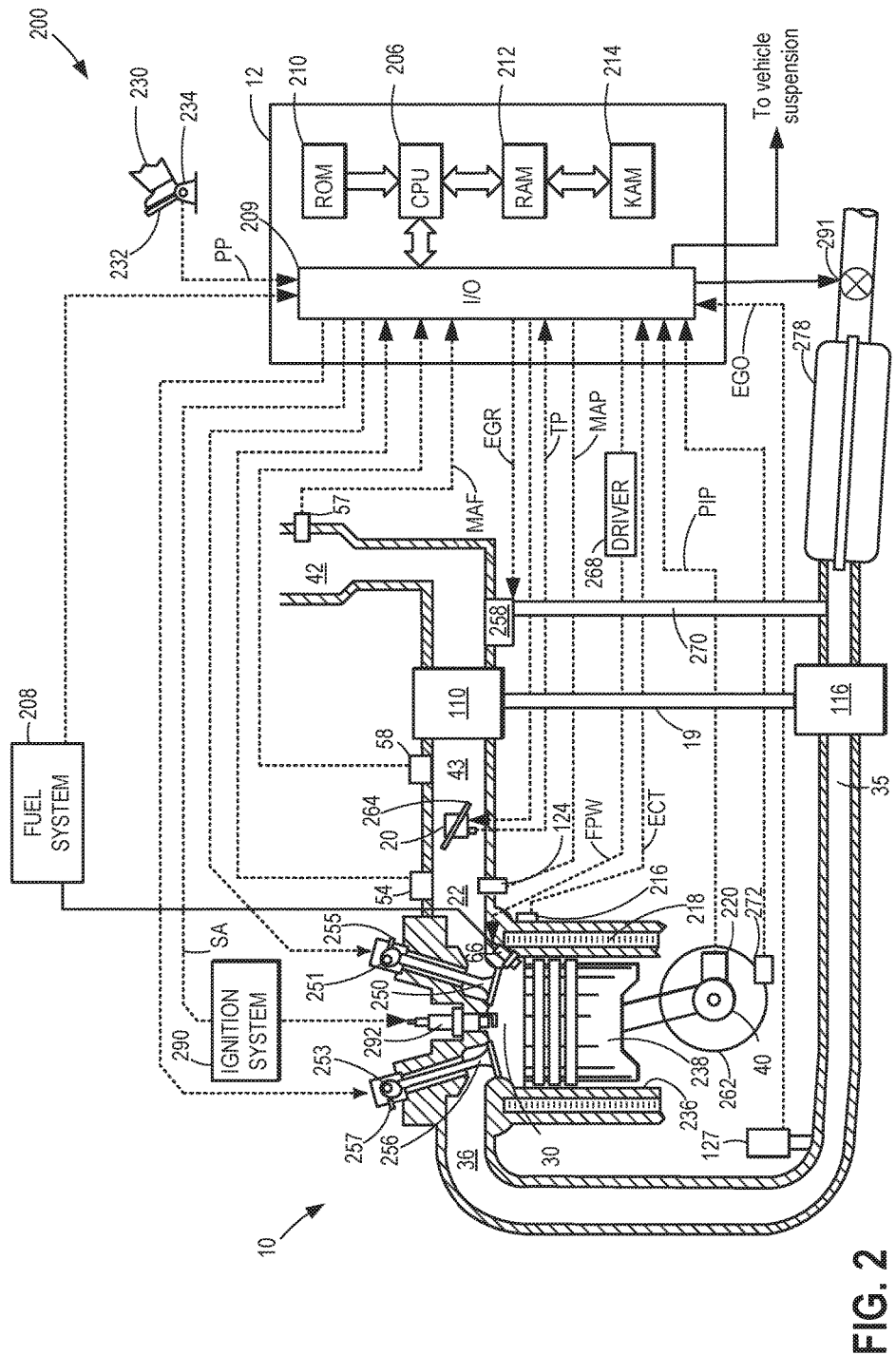
FIG. 2 shows a diagram of an example embodiment of one cylinder of the engine of FIG. 1.
Figure 5:
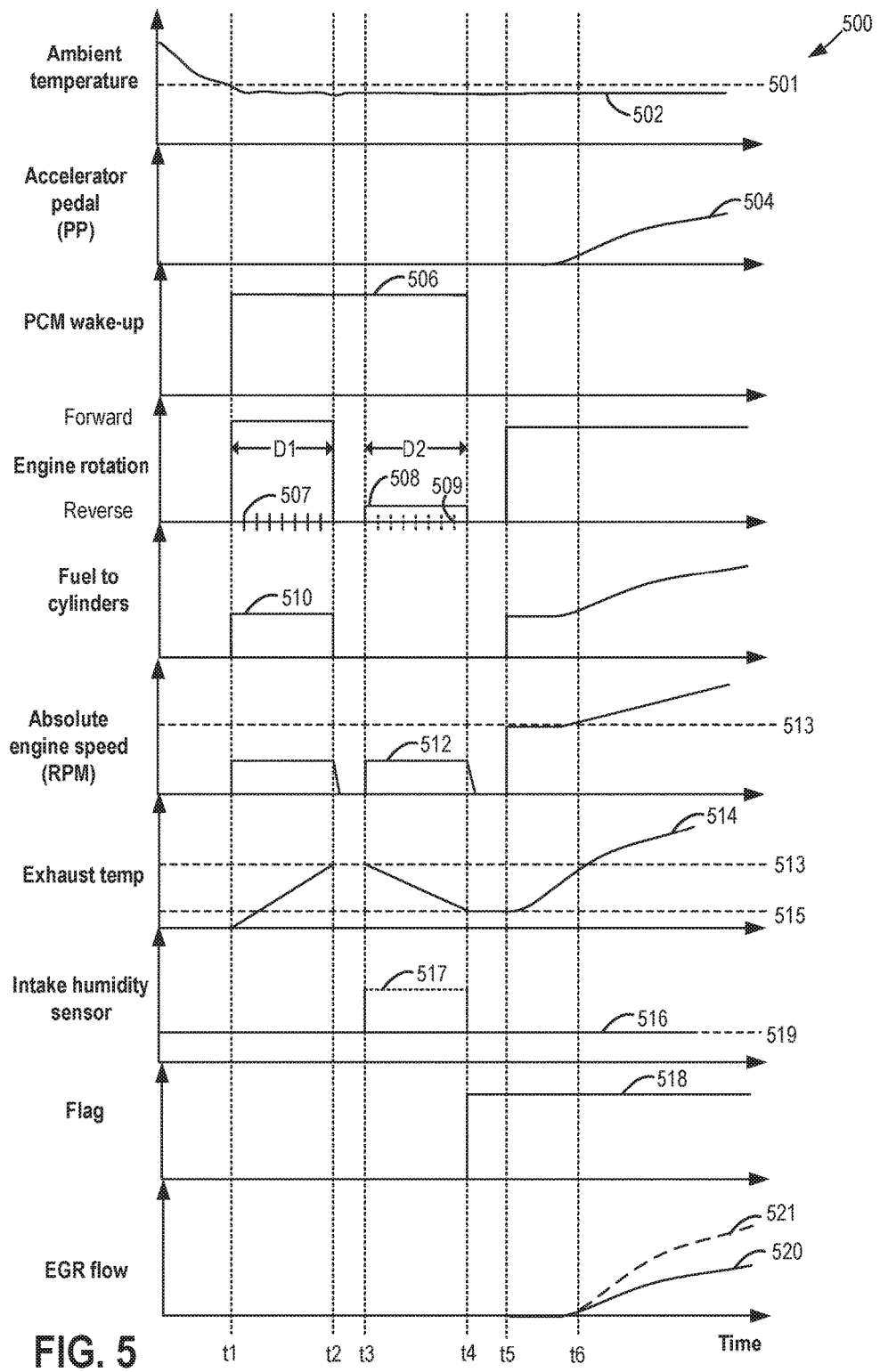
FIG. 5 shows an example operation of an engine performing the diagnostic routine of FIG. 3 during a PCM wake-up, and subsequent engine operation.
Figure 6:
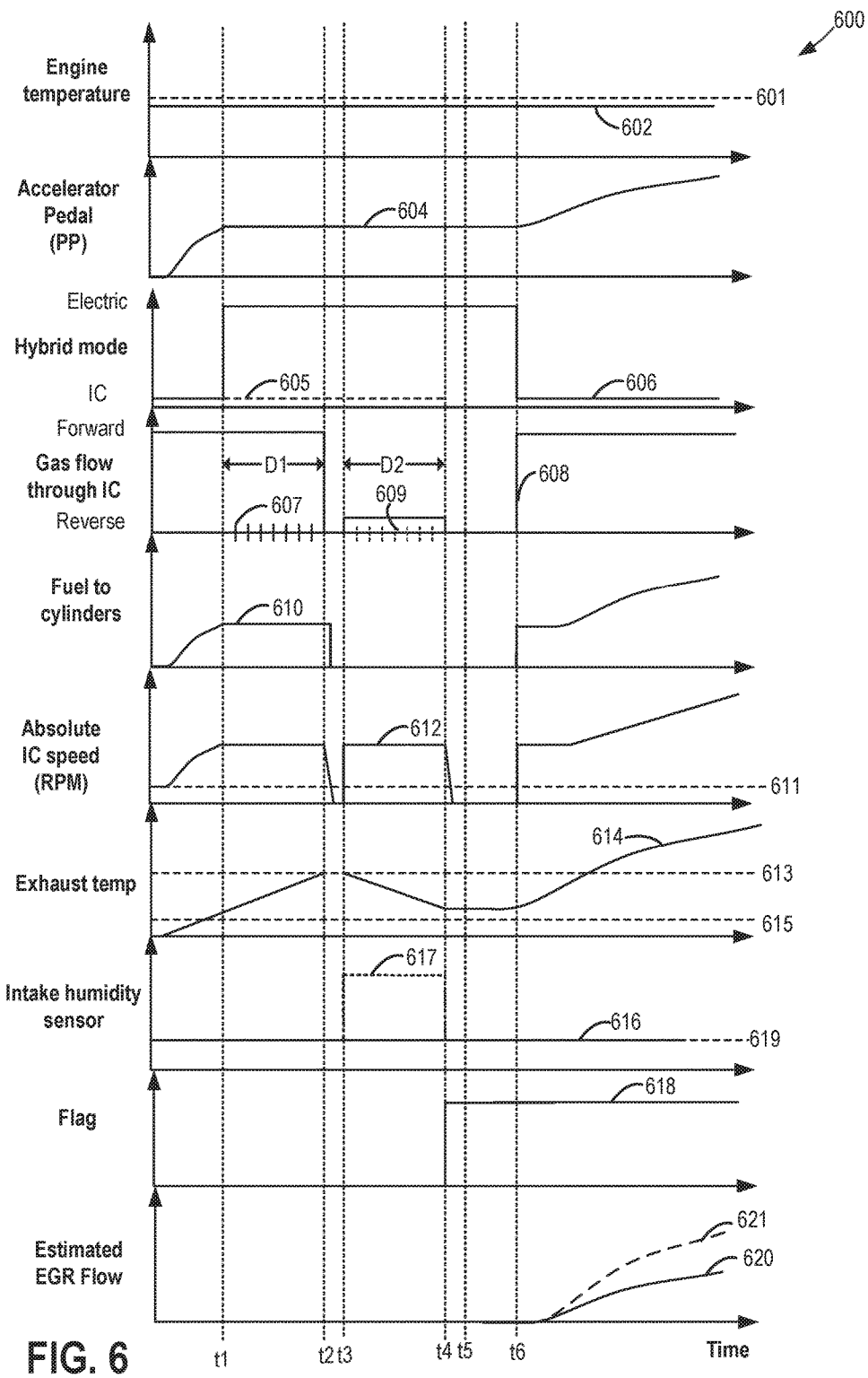
FIG. 6 shows an example operating of a hybrid engine performing the diagnostic routine of FIG. 3, and subsequent engine operation.

The following description relates to systems and methods for engines with one or more humidity sensors positioned in an intake (e.g., intake system, intake passage, and/or intake manifold) of the engine. One non-limiting example embodiment of a hybrid vehicle system including a turbocharged engine and a humidity sensor positioned in the intake of the engine, is shown in FIG. 1. A cross-sectional view of one cylinder (e.g., combustion chamber) of the engine of FIG. 1, including the intake humidity sensor, is shown in FIG. 2. An engine controller may be configured to perform a control routine, such as the example routine of FIG. 3 to perform a diagnostic of the intake humidity sensor responsive to conditions that include an engine-off condition, such as a vehicle soak (e.g., engine-off condition) lasting more than a threshold duration, and an ambient temperature below a threshold. As a result, the controller (e.g., a power-train control module (PCM) of the controller) may wake up from the sleep mode upon elapse of the threshold duration and perform the diagnostic of FIG. 3 responsive to diagnostic entry conditions being satisfied. Further, subsequent engine operation may be adjusted responsive to the outcome of the diagnostic, as shown in FIG. 5. The diagnostic may include flowing gases through the engine in a forward direction for a first duration while combusting fuel in order to generate a threshold amount of water vapor. An engine parameter may be adjusted prior to generating water vapor in order to prevent the water vapor from exiting the exhaust system, and then within a threshold duration of flowing gases through the engine in the forward direction, the flow of gases through the engine is reversed. In this way, the water vapor generated is passed back through the engine, to the intake manifold, where it may elicit a response from a humidity sensor positioned in the intake manifold or intake passage. In this way, humidity may be introduced to the humidity sensor in order to assess its functionality, regardless of driver habits and arid ambient conditions. Alternate embodiments may include an autonomous vehicle, which may have slightly different diagnostic entry conditions from a conventional internal combustion engine, as shown in FIG. 4. Further, the humidity sensor diagnostic may be performed shortly after a cold start condition of a hybrid vehicle system, as shown in FIG. 6. In this way, operation of the intake humidity sensor may be diagnosed prior to vehicle operation and/or during a cold start of the engine while the vehicle is operating. As a result, the humidity sensor may be diagnosed more accurately under various operating conditions, thereby providing more accurate and efficient engine control based on the output of the intake humidity sensor.

Turning now to FIG. 1, an example embodiment of a vehicle system 100 is illustrated schematically (not to scale). In one example, vehicle system 100 may be configured as an on-road motor vehicle. However, it will be appreciated that in other examples vehicle system 100 may be configured as an off-road vehicle. In some examples, vehicle system 100 may be a hybrid vehicle with multiple sources of torque available to one or more vehicle wheels 76. In other examples, vehicle system 100 is a conventional vehicle with only an engine, or an electric vehicle with only electric machine(s). In the example shown, vehicle system 100 includes engine 10 and an electric machine 72. Electric machine 72 may be a motor or a motor/generator. Crankshaft 40 of engine 10 and electric machine 72 are connected via a transmission 74 to vehicle wheels 76 when one or more clutches 73 are engaged. In the depicted example, a first clutch 73 is provided between crankshaft 40 and electric machine 72, and a second clutch 73 is provided between electric machine 72 and transmission 74. Controller 12, discussed herein, may send a signal to an actuator of each clutch 73 to engage or disengage the clutch, so as to connect or disconnect crankshaft 40 from electric machine 72 and the components connected thereto, and/or connect or disconnect electric machine 72 from transmission 74 and the components connected thereto. Transmission 74 may be a gearbox, a planetary gear system, or another type of transmission. The powertrain may be configured in various manners including as a parallel, a series, or a series-parallel hybrid vehicle. In this way, the vehicle system 100 may be propelled by one or more of the electric machine 72 and engine 10, responsive to operating conditions and operator torque demand.

Electric machine 72 receives electrical power from a traction battery 75 to provide torque to vehicle wheels 76. Electric machine 72 may also be operated as a generator to provide electrical power to charge battery 75, for example during a braking operation. It will be appreciated that the engine system of FIG. 1 may also include a starter motor, as shown in FIG. 2. In other examples, where vehicle system 100 is a conventional vehicle with only an engine, traction battery 75 may be a starting-lighting-ignition (e.g., SLI) battery that supplies electrical energy to vehicle system 100.

Vehicle system 100 may further include a suspension system 79. Suspension system may include one or more features (e.g., shock absorbers, struts) proximate vehicle wheels 76 in order to adjust the profile of the vehicle system 100, responsive to a command from controller 12 that may be based on driving conditions and/or vehicle load (e.g., towing, passenger and luggage capacity). In one example, controller 12 may actuate the suspension system 79 in order to "stiffen" the suspension system 79 responsive to the vehicle towing a heavy load. In this way, vehicle suspension may be adjusted for heavy loads. It will also be appreciated that in some embodiments, suspension system 79 may selectively actuate the suspension features proximate each vehicle wheel 76 independently as described below.

In the depicted embodiment, a turbocharger 13 is coupled to engine 10. Turbocharger 13 comprises a turbine 116 positioned in the exhaust passage 35 coupled to a compressor 110 positioned in an intake passage 42. Turbine 116 and compressor 110 may be coupled via a shaft 19. Compressor 110 may be positioned upstream of a charge air cooler 18 (also referred to herein as CAC) and a throttle 20. Turbine 116 may be driven (e.g., spun) by expanding exhaust gases leaving engine 10 via exhaust manifold 36 and exhaust passage 35, and the rotational energy of turbine 116 may be transferred via shaft 19 to rotate compressor 110.

Engine 10 receives air along intake passage 42 via an air box 44 including air cleaner 112. The air is compressed by the compressor 110 of turbocharger 13 and compressed air is delivered to induction (e.g., intake) passage 43. The compressed air passes through intake passage 43, through the CAC 18 to cool, and through throttle 20 before entering an intake manifold 22 where it then may enter one or more cylinders 30 of engine 10. In other words, compressor 110 is coupled through charge air cooler 18 to intake throttle 20 and intake throttle 20 is coupled upstream of intake manifold 22. The charge-air cooler may be an air-to-air or water-to-air heat exchanger, for example. In the embodiment shown in FIG. 1, the pressure of the air charge within intake manifold 22 is sensed by a manifold air pressure (MAP) sensor 124.

It will be appreciated that other combinations and configurations of boosting devices may be possible. In one embodiment, the turbocharger may be a twin scroll device. In another embodiment, turbocharger 13 may be a variable geometry turbocharger (VGT), where turbine geometry is actively varied as a function of engine operating conditions. In yet another embodiment, vehicle system 100 may include a supercharger or both a supercharger and turbocharger. For an embodiment that includes a supercharger, compressor 110 may be at least partially driven by an electric machine and/or the engine 10, and may not include turbine 116.

In some examples, compressor 110 may include a recirculation passage 80 across the compressor. The depicted example shows a compressor recirculation valve (CRV) 82 coupled across the recirculation passage 80, where actuation of the CRV 82 may adjust the flow through the recirculation passage 80. Warm, compressed air from the compressor outlet may be recirculated back to the compressor inlet via recirculation passage 80. In some embodiments, the compressor recirculation system may alternatively, or additionally, include a recirculation passage for recirculating (cooled) compressed air from the compressor outlet, downstream of the charge air cooler to the compressor inlet or a compressor bypass for dissipating compressed air to atmosphere (not shown). The CRV 82 may be a continuously variable valve wherein a position of the valve is continuously variable from a fully closed position to a fully open position. In some embodiments, compressor recirculation valve 82 may be normally partially open during boosted engine operation to provide some surge margin. Herein, the partially open position may be a default valve position. Increasing the opening of the compressor recirculation valve may include actuating (or energizing) a solenoid of the valve. Further discussion of example CRV operation will be discussed herein.

One or more sensors may be coupled to an inlet of the compressor 110, as shown in FIG. 1 for determining a composition and condition of air charge entering the compressor. For example, an intake air temperature (IAT) sensor 55 may be coupled to the intake passage 42, proximate the inlet of the compressor 110 for estimating a compressor inlet temperature. In some embodiments, IAT sensor 55 may be an ambient temperature sensor, and it will be appreciated that it may be located such that it may estimate an ambient temperature external to the vehicle system 100. As another example, a pressure sensor 56 may be coupled to the inlet of the compressor for estimating a pressure of air charge entering the compressor. In a further example, a mass airflow (MAF) sensor 57 may also be coupled to the inlet of the compressor for estimating the amount of air entering the engine.

Engine 10 may also include a humidity sensor 54 positioned in an intake of the engine. The humidity sensor 54 may also be referred to as an intake oxygen sensor. In the depicted embodiment, humidity sensor 54 is positioned downstream of the intake throttle 20 in the intake manifold 22. Humidity sensor 54 may detect a water vapor concentration of air entering the intake manifold via intake passage 43. It will be appreciated, however, that the intake humidity sensor 54 may be located in the intake passage 43, upstream of the throttle 20, but downstream of compressor 110, or in another suitable position. A relative humidity reading generated by the humidity sensor is indicative of the amount of water vapor in the incoming fresh intake air, or in the combination of fresh intake air and recirculated exhaust air, based on the position of the EGR valve, as shown in FIG. 2 and discussed further below. Other sensors that may be included coupled to engine 10 may include air-fuel ratio sensors and oxygen (02) sensors, among others. In other examples, a throttle inlet pressure (TIP) sensor 58 or other similar sensor may be coupled downstream of the compressor 110 and upstream of the throttle 20, for measuring the pressure at a location downstream of the compressor 110 and upstream of the throttle 20. In this way, a compressor outlet pressure may be determined.

Intake manifold 22 is coupled to a series of combustion chambers 30 through a series of intake valves (described below in reference to FIG. 2). The combustion chambers are further coupled to exhaust manifold 36 via a series of exhaust valves (described below in reference to FIG. 2). In the depicted embodiment, a single exhaust manifold 36 is shown. However, in other embodiments, exhaust manifold 36 may include a plurality of exhaust manifold sections. Configurations having a plurality of exhaust manifold sections may enable effluent from different combustion chambers to be directed to different locations in engine 10.

Combustion chambers 30 may be supplied by a fuel system (described below in reference to FIG. 2) with one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. Direct injection comprises injecting the fuel directly into the combustion chamber, and port injection delivers the fuel spray into the intake ports where it mixes with the intake air before entering the combustion chamber. The present example may include a plurality of direct fuel injectors 66 and port fuel injectors 67. It will be appreciated that in the combustion chambers 30, combustion may be initiated via spark ignition and/or compression ignition.

As shown in FIG. 1, exhaust from the one or more sections of exhaust manifold 36 is directed to turbine 116 to drive the turbine. When reduced turbine torque is desired, some exhaust may be directed instead through a waste-gate 90, bypassing the turbine 116. Waste-gate valve 92, coupled to waste-gate 90, may be actuated open to allow at least some exhaust pressure from upstream of the turbine 116 to be diverted to a location downstream of the turbine via waste-gate 90 rather than passing through the turbine 116, promoting rotation of the turbine. By reducing exhaust pressure upstream of the turbine 116, turbine speed may be reduced. In one embodiment, waste-gate valve 92 may be vacuum actuated, that is, it may be actuated via the application of vacuum. The combined flow from the turbine 116 and the waste-gate 90 then flows through emission control (described below in reference to FIG. 2) before all or part of the treated exhaust may be released into the atmosphere via exhaust passage 35.

During conditions when there is a transient increase in driver torque demand, such as during a tip-in, when going from engine operation without boost to engine operation with boost, the throttle 20 opening may be increased to increase air flow to the engine. The opening of the waste-gate valve 92 may decreased to increase the flow of exhaust gas through the turbine 116, which increases the speed of the turbine. In one example, the waste-gate valve 92 may be fully closed. The increased speed of the turbine 116 drives the compressor 110.

During conditions when there is a decrease in driver torque demand, such as during a tip-out, when going from engine operation with boost to engine operation without boost, or reduced boost, the throttle 20 opening may be decreased. In one example, the throttle 20 opening may be closed. In another example, the CRV 82 may be opened so that the higher speed of the turbine 116 does not overwhelm the compressor 110 and cause compressor surge. The waste-gate valve 92 is also opened to increase the flow of exhaust gas bypassing the turbine 116 and reduce turbine speed. This allows excess boost pressure to be substantially immediately relieved.

During conditions when engine 10 is idling and the vehicle system 100 is stopped, the intake throttle may be opened just enough to keep the engine running. In other examples, such as where the engine includes an idle control valve, the intake throttle may be fully closed while the idle control valve is opened so that sufficient air is delivered to the engine to keep the engine idling. As such, during engine idling conditions, the compressor 110 may not be spinning.

Vehicle system 100 may further include control system 14 which includes controller 12. The controller 12 receives signals from the various sensors of FIG. 1 and employs the various actuators of FIG. 1 to adjust engine operation based on the received signals and instructions stored on a memory of the controller. Control system 14 may also include a timer (not shown), which may measure a duration of time elapsed after one or more of a vehicle event, engine event, or other condition being met.

As one example, sensors 16 may include MAP sensor 124, an exhaust gas sensor 127, an exhaust temperature sensor 128, an exhaust pressure sensor 129, intake air temperature sensor 55, humidity sensor 54, compressor inlet pressure sensor 56, manifold air flow sensor 57, and throttle inlet pressure sensor 58. Other sensors such as additional pressure, temperature, air/fuel ratio, and composition sensors may be coupled to various locations of engine 10. The actuators 81 may include, for example, throttle 20, compressor recirculation valve 82, waste-gate valve 92, direct fuel injector 66, and port fuel injector 67. Additional actuators, which will be described below in reference to FIG. 2, include an EGR valve, spark plug, and starter motor with solenoid. It will be appreciated that the positions of the sensors 16 and actuators 81 of FIG. 1 are shown as one non-limiting example, and may be otherwise suitably positioned. As one example, responsive to a request to stop combustion in the cylinders 30, the controller 12 may send signals to one or more of the direct fuel injector 66 and port fuel injector 67 to withhold or stop fuel delivery to cylinders 30 in order to stop combustion events in the cylinders 30.

Figure 3:
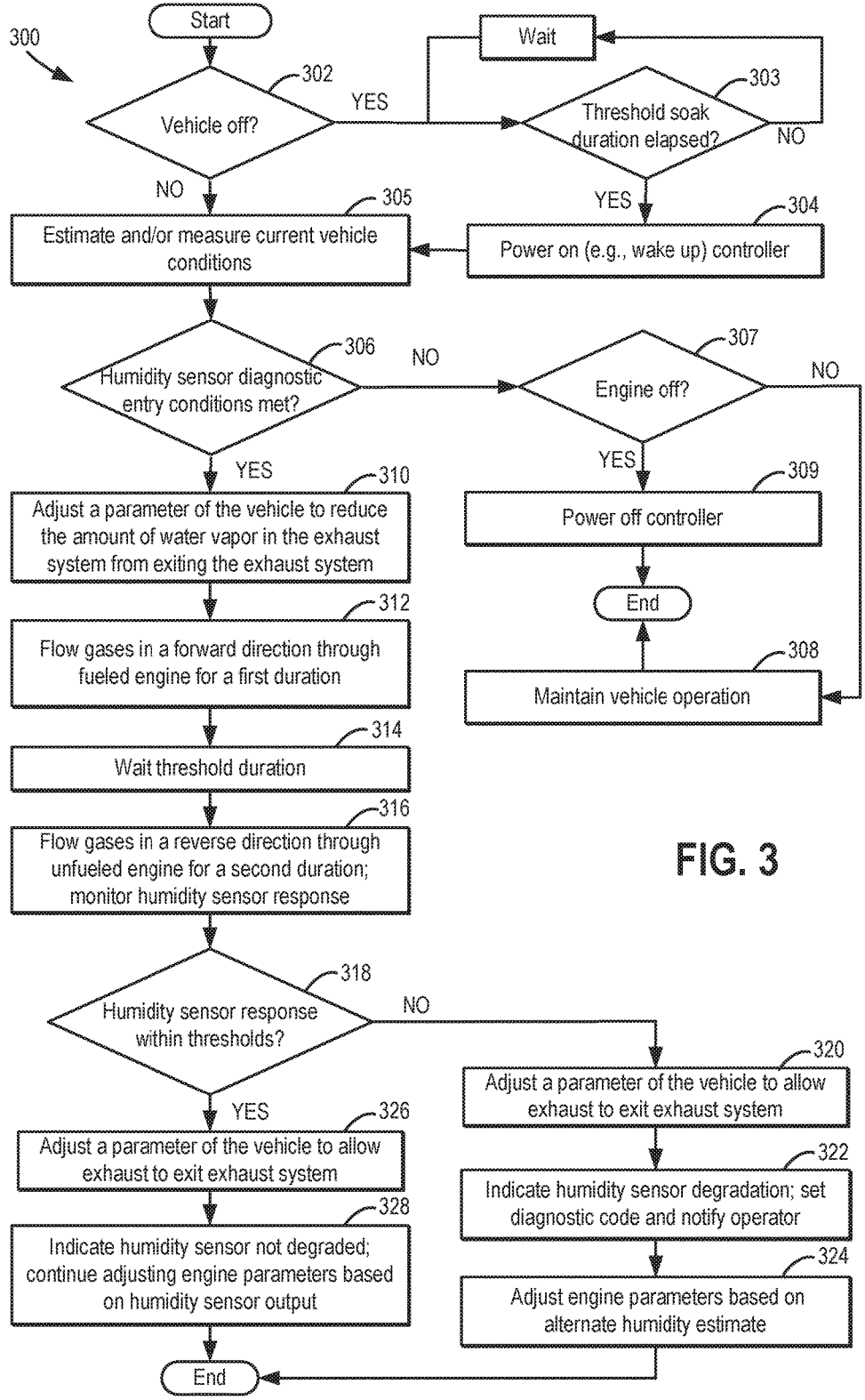
FIG. 3 shows an example embodiment of a control routine for generating a quantity of water vapor and performing a diagnostic of a humidity sensor positioned in an intake of an engine.
Figure 4:
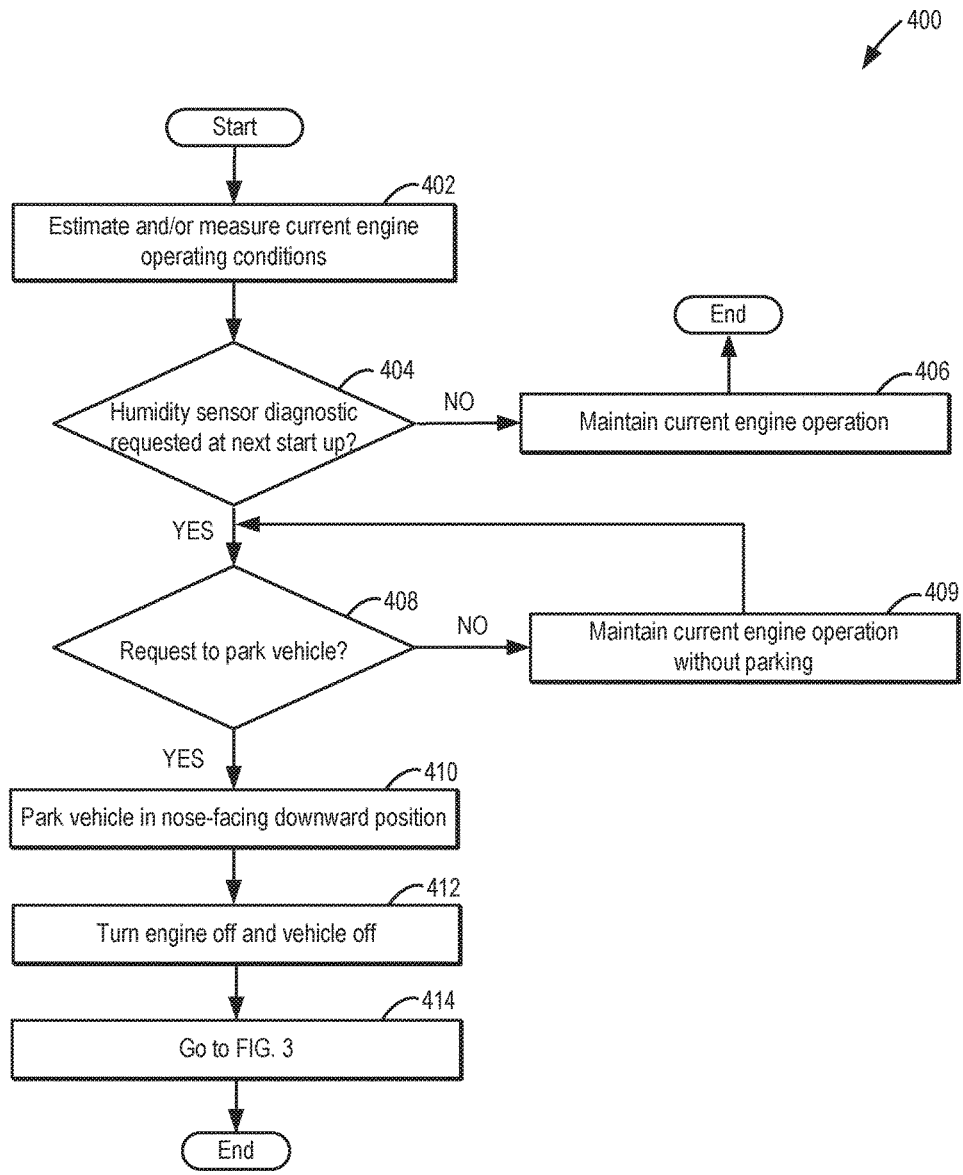
FIG. 4 shows an example embodiment of a control routine for initiating a diagnostic of a humidity sensor positioned in an intake of an engine for an autonomous vehicle.

Additionally, controller 12 may employ the actuators 81 in response to the processed input data from sensors 16 based on instructions stored in the memory of the controller or code programmed therein corresponding to one or more routines, such as the example control routines described herein with regard to FIGS. 3 and 4. For example, responsive to an indication of a vehicle soak duration greater than a threshold soak duration, as may be indicated by a timer and an ambient temperature indication, as may be indicated by an ambient temperature sensor 55, controller 12 may actuate the starter motor in order to crank (e.g., spin) engine 10. It will be appreciated that actuating the starter motor may include actuating a starter solenoid, which may be configured to receive electric current from battery 75. The electric current may cause the starter solenoid to make an electrical coupling with the starter motor, thus relaying an electric current through the starter motor. As a result, rotation of the starter motor cranks the engine 10. As one example, controller 12 may determine whether the vehicle has achieved a threshold soak duration. A threshold soak duration may include when engine 10 remains off for a predetermined amount of time. Specifically, the engine-off duration includes the engine being shut down for a period of time that is greater than a threshold time. It will be appreciated that a threshold soak duration may be based on modeled data, for the elapsed time required for the engine conditions to be within a threshold of ambient conditions. For example, a threshold soak duration may include the amount of time that it takes for the ambient humidity in the intake manifold (as indicated by the output of intake humidity sensor 54) to reach an ambient humidity level external to the vehicle. In other examples, the threshold soak time may be determined responsive to indications of ambient conditions, such as temperature and pressure.

In this way, an engine-off duration may include the engine being shut down for a period of time that is greater than a threshold time and wherein flowing the gases through the engine in the first and second directions and obtaining the output of the humidity sensor are initiated responsive to each of the engine-off duration and an ambient temperature being below a threshold temperature.

Turning now to FIG. 2, it shows an example embodiment 200 of a combustion chamber or cylinder of an internal combustion engine, such as engine 10 of FIG. 1. Components that are identical or similar to those of FIG. 1 may be numbered similarly. Engine 10 may receive control parameters from a control system including controller 12 and input from a vehicle operator 230 via an input device 232. In this example, input device 232 includes an accelerator pedal and a pedal position sensor 234 for generating a proportional pedal position signal PP. Cylinder (herein also "combustion chamber") 30 of engine 10 may include combustion chamber walls 236 with piston 238 positioned therein. Piston 238 may be coupled to crankshaft 40 so that reciprocating motion of the piston is translated into rotational motion of the crankshaft. Crankshaft 40 may be coupled to a flywheel 262 and at least one drive wheel of the passenger vehicle via a transmission system. Further, a starter motor 272 may be coupled to crankshaft 40 via flywheel 262 to enable cranking (e.g., spinning) of engine 10, typically used for starting the engine. When starting an engine, after combustion occurs, actuation of the starter is ceased as combustion facilitates spinning of the engine. In one example, starter motor 272 may be a conventional starter motor. In other examples, starter motor 272 may be an integrated starter motor or a motor generator (as shown in FIG. 1), such as those typically found on hybrid vehicles.

Starter motor 272 may also be configured such that it can operate in two directions (e.g., operate in a first direction and a second direction, the second direction opposite the first direction). In one example, an H-bridge circuit may be coupled to (and/or included with) the starter motor 272 and be actuated to change the direction of rotation of the starter motor 272. The H-bridge circuit may include four controllable switches that allow reversal of the polarity of the current flowing in the motor when the switches are selectively actuated. In this way, the H-bridge circuit may be electrically actuated to a first configuration such that the starter motor 272 may spin in a first, forward direction. Thus, when the starter motor rotates, it causes the flywheel 262 and crankshaft 40 to rotate in their respective first (e.g., forward) directions. Additionally, the H-bridge circuit may be electrically actuated to a second configuration such that the starter motor may spin in a second, reverse direction. Therein, when the starter rotates, it causes the flywheel and crankshaft to rotate in their respective second (e.g., reverse) directions. Because the pistons 238 are directly coupled to the crankshaft 40, the pistons will rotate in a direction corresponding to the rotation of the crankshaft. In embodiments that include the intake valves and exhaust valves also coupled to the crankshaft via a mechanical coupling (e.g., timing belt, timing chain) the valves may also rotate in direction that corresponds to the rotation of the crankshaft. In this way, air flow through the engine may be reversed. Specifically, exhaust gas may be drawn from the exhaust manifold 36 and/or exhaust passage 35, into the cylinder 30 through the open exhaust valve 256, and expelled through open intake valve 250 into intake manifold 22.

Cylinder 30 may receive intake air via a series of air intake passages 42 and 43 and intake manifold 22. Intake manifold 22 can communicate with other cylinders of engine 10 in addition to cylinder 30. In some embodiments, one or more of the intake passages may include a boosting device such as a turbocharger or a supercharger. For example, FIG. 1 shows engine 10 configured with a boosting device configured as a turbocharger. Turbocharger includes a compressor 110 arranged between intake passages 42 and 43, and exhaust turbine 116 arranged along exhaust passage 35. As previously described, compressor 110 may be at least partially powered by exhaust turbine 116 via shaft 19. A charge air cooler (as shown in FIG. 1) may be optionally included downstream of compressor 110. However, in other examples, such as where engine 10 is provided with a supercharger, exhaust turbine 116 may be optionally omitted, where compressor 110 may be powered by mechanical input from a motor or the engine 10. Throttle 20 may include a throttle plate 264 may be provided along an intake passage of the engine for varying the flow rate and/or pressure of intake air provided to the engine cylinders. For example, throttle 20 may be disposed downstream of compressor 110 as shown in FIG. 1. Optionally or additionally, a throttle may be provided upstream of compressor 110.

Exhaust manifold 36 may receive exhaust gases from other cylinders of engine 10 in addition to cylinder 30. Exhaust gas sensor 127 is shown coupled to exhaust passage 35 upstream of emission control device 278. It will be appreciated that emission control device 278 may also be known as an after treatment device. Exhaust gas sensor 127 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 278 may be a three way catalyst (TWC), NOx trap, various other emission control devices, or combinations thereof. Exhaust passage 35 may include an exhaust flow valve 291 positioned downstream of the emission control device 278. In one example, exhaust flow valve may be an exhaust tuning valve. In some embodiments, exhaust flow valve may be positioned upstream of the turbine 116 and/or the emission control device 278. Actuation of the exhaust flow valve may allow selective control of the amount of exhaust gas exiting to atmosphere. In one example, controller 12 may send a command signal to an actuator of exhaust tuning valve 291 in order to decrease the opening (e.g., close or fully close) the exhaust tuning valve 291, thereby preventing flow of exhaust gases to atmosphere.

As previously described with reference to FIG. 1, exhaust gas temperature may be estimated using an exhaust temperature sensor 128. Alternatively, exhaust temperature may be inferred based on engine operating conditions such as speed, load, air-fuel ratio (AFR), spark retard, etc. Further, exhaust temperature may be computed using empirical data based on a sensor output of one or more exhaust gas sensors 127. It may be appreciated that the exhaust gas temperature may alternatively be estimated by other combinations of temperature estimations.

Exhaust passage 35 and intake passage 42 may be fluidically coupled via an EGR passage 270 (e.g., EGR passage) that serves to recirculate exhaust gas from the exhaust passage 35 to the intake passage 42. Flow through the EGR passage 270 is controlled by an EGR valve 258, which regulates the quantity of recirculated exhaust gas. The EGR valve 258 may be a continuously variable valve wherein a position of the valve is continuously variable from a fully closed position to a fully open position. In one example, the controller 12 may send a signal to the actuator (not shown) of the EGR valve 258 to move it to fully closed position, responsive to a cold start condition, thereby preventing exhaust gas from recirculating from the exhaust passage 35 to the intake passage 42. In another example, the controller 12 may send a signal to the actuator of the EGR valve 258 to adjust the opening of the EGR valve in response to operator demand. In one example, the control may send a signal to the actuator of the EGR valve 258 to move it to a fully open position, such as during a medium vehicle speed/load condition, allowing an increased flow of exhaust gas to recirculate from the exhaust passage 35 to the intake passage 42. In yet another example, responsive to a sensor output from a humidity sensor 54 positioned in intake manifold 22, controller 12 may estimate EGR flow based on the humidity sensor output, and then send a signal to EGR valve 258 in order the adjust the amount of exhaust gas recirculating from exhaust passage 35 to intake passage 42 based on the estimated EGR flow and a desired EGR flow amount (which may be based on additional engine operating conditions).

An EGR pressure sensor (not shown) may be coupled to the EGR system in order to determine the exhaust gas flow rate through the EGR passage 270. In one example, the EGR pressure sensor may be a differential pressure sensor that measures the change in exhaust flow pressure before and after a restriction (e.g., orifice) in the EGR passage 270 that leads to the EGR valve 258. In one example, the EGR pressure sensor may be a Delta Pressure Feedback Exhaust (DPFE) sensor. In other examples, other suitable sensor configurations may be used. The EGR pressure sensor may send time-based EGR signals to the controller during engine operation.

The controller 12 may selectively actuate a vacuum solenoid (not shown) to actuate the EGR valve 258. The controller may actively control the EGR valve via the vacuum solenoid based on various engine signals. In one example, the controller may receive an indication of engine coolant temperature (ECT) from temperature sensor 216 coupled to cooling sleeve 218, a throttle position (TP) from a throttle position sensor, an exhaust gas flow measurement (of exhaust entering the intake via the EGR passage) from EGR pressure sensor 126 and/or humidity sensor 54, or an absolute manifold pressure signal from MAP sensor 124 to regulate the vacuum solenoid. As an example, during a cold start condition, the controller may receive a signal indicating that the engine coolant temperature is below a threshold, and will thereby activate the vacuum solenoid to block vacuum to the EGR valve, keeping the EGR valve closed and preventing exhaust gas from recirculating from the exhaust passage 35 to the intake passage 42. In another example, under vehicle acceleration, motion of the throttle plate 264 may open a vacuum port that will actuate the EGR valve 258 to open. In further examples, other control methods for EGR valve actuation may be used. In one example, responsive to an indication of an increase in ambient humidity, as may be indicated by humidity sensor 54 positioned in the intake manifold 22, the controller 12 may send a signal to EGR valve 258 in order to decrease the opening of the EGR valve 258. In this way, the likelihood of condensation may be reduced.

Controller 12 may also selectively control a vehicle suspension system (e.g., vehicle suspension system 79 of FIG. 1). In one example, responsive to a controller command to move the vehicle to a nose-downward position, the controller 12 may send a signal to an actuator of a strut or shock absorber proximate the front wheels to reduce stiffness and allow the front of the vehicle to drop closer to the ground. Additionally, the controller 12 may send a signal to an actuator of a strut or shock absorbed proximate the rear wheels to increase stiffness and/or raise the rear of the vehicle. It will be appreciated that the suspension system may include a hydraulic or pneumatic actuator to adjust the suspension system.

Each cylinder of engine 10 may include one or more intake valves and one or more exhaust valves. For example, cylinder 30 is shown including at least one poppet-style intake valve 250 and at least one poppet-style exhaust valve 256 located at an upper region of cylinder 30. In some embodiments, each cylinder of engine 10, including cylinder 30, may include at least two intake poppet valves and at least two exhaust poppet valves located at an upper region of the cylinder.

Intake valve 250 may be controlled by controller 12 by cam actuation via cam actuation system 251. Similarly, exhaust valve 256 may be controlled by controller 12 via cam actuation system 253. Cam actuation systems 251 and 253 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 250 and exhaust valve 256 may be determined by valve position sensors 255 and 257, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In some embodiments, each cylinder of engine 10 may include a spark plug 292 for initiating combustion. Ignition system 290 can provide an ignition spark to combustion chamber 30 via spark plug 292 in response to spark advance signal SA from controller 12, under select operating modes. However, in some embodiments, spark plug 292 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 60 is shown including one fuel injector 66. Fuel injector 66 is shown coupled directly to cylinder 30 for injecting fuel directly therein in proportion to the pulse width of signal FPW received from controller 12 via electronic driver 268. In this manner, fuel injector 66 provides what is known as direct injection (hereafter also referred to as "DI") of fuel into combustion cylinder 30. While FIG. 2 shows fuel injector 66 as a side injector, it may also be located overhead of the piston, such as near the position of spark plug 292. Such a position may facilitate mixing and combustion when operating the engine with an alcohol-based fuel due to the lower volatility of some alcohol-based fuels. Alternatively, the injector may be located overhead and near the intake valve to facilitate mixing. Fuel may be delivered to fuel injector 66 from a high pressure fuel system 208 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, fuel injector 66 may be a port injector providing fuel into the intake port upstream of cylinder 30.

It will also be appreciated that while the depicted embodiment illustrates the engine being operated by injecting fuel via a single direct injector, in alternate embodiments, the engine may be operated by using two injectors (for example, a direct injector and a port injector) and varying a relative amount of injection from each injector. As described above, FIG. 2 shows one cylinder of a multi-cylinder engine. As such each cylinder may similarly include its own set of intake/exhaust valves, fuel injector(s), spark plug, etc.

Further, the distribution and/or relative amount of fuel delivered from the injector may vary with operating conditions. In one example, hybrid vehicles may be propelled by a battery-powered electric motor (e.g., motor 72 of FIG. 1) and not the internal combustion engine (which may be known as electric mode). Specifically, in response to an indication of operating conditions conducive to operating the vehicle in electric mode, the controller 12 may send a signal to fuel system 208 to stop fuel delivery to cylinders of the engine in order to stop combustion events and increase fuel economy until an operator torque demand is received or engine operating conditions change such that fuel delivery is resumed and the internal combustion engine is restarted. Signals indicating engine speed, pedal position, and throttle position may be used to determine when the controller initiates entering electric mode.

Controller 12 is shown as a microcomputer, including microprocessor unit 206, input/output ports 209, an electronic storage medium for executable programs and calibration values shown as read-only memory chip 210 in this particular example, random access memory 212, keep alive memory 214, and a data bus. Controller 12 may receive various signals from sensors coupled to engine 10, in addition to those signals previously discussed, including measurement of inducted mass air flow (MAF) from mass air flow sensor 57; engine coolant temperature (ECT) from temperature sensor 216 coupled to cooling sleeve 218; a profile ignition pickup signal (PIP) from Hall effect sensor 220 (or other type) coupled to crankshaft 40; throttle position (TP) from a throttle position sensor; absolute manifold pressure signal from MAP sensor 124, cylinder AFR from EGO sensor 127, and exhaust gas flow from an EGR pressure sensor. Further, controller 12 may receive an estimate of humidity from humidity sensor 54. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIGS. 1-2 and employs the various actuators of FIGS. 1-2 to adjust engine operation based on the received signals and instructions stored on a memory of the controller.

Non-transitory storage medium read-only memory chip 210 can be programmed with computer readable data representing instructions executable by microprocessor unit 206 for performing the methods described below as well as other variants that are anticipated but not specifically listed.

In this way, a system for a hybrid vehicle is provided. The system comprising an engine including a plurality of cylinders, a crankshaft and an electric motor, each coupled to a transmission of the hybrid vehicle, an intake manifold, a humidity sensor positioned in the intake manifold, and a controller including non-transitory instructions stored in memory for: following the engine being turned off for a threshold duration, adjusting a component of the hybrid vehicle to block water vapor from exiting out an exhaust system of the engine, and while the hybrid vehicle is moving: cranking the engine in a forward direction while combusting fuel at the engine cylinders for a second duration; cranking the engine in a reverse direction while not combusting fuel at the engine cylinders following the second duration; and indicating degradation of the humidity sensor based on a change in output of the humidity sensor during the cranking the engine in the forward direction and the reverse direction.

Turning now to FIG. 3, it illustrates a routine 300 for performing a diagnostic of a humidity sensor (e.g., humidity sensor 54 of FIGS. 1-2) positioned in the intake system (such as in intake manifold 22 of FIGS. 1-2) of an engine (such as engine 10 shown in FIGS. 1-2) responsive to a duration of time elapsed since an engine-off event. It will be appreciated that the humidity sensor may be positioned at other locations in the intake system of the engine. In the depicted example, a vehicle-off event may be confirmed in response to one or more of a key-off condition where the vehicle includes an active key, a stop button actuated condition where the vehicle includes an ignition start/stop button, and a passive key being outside a threshold distance of the vehicle where the vehicle includes a passive key. A vehicle-off event may also include an automatic engine-off command from a controller, as may occur in autonomous vehicle embodiments. In response to the vehicle-off event, the controller (e.g., PCM) may be shifted to a sleep mode to reduce vehicle-off energy consumption by on-board sensors, auxiliary components, and diagnostics. In addition, a timer may be started that may measure a vehicle soak duration relative to a threshold soak duration.

Prior to 302, it may have been determined that the threshold soak duration elapsed since the previous vehicle-off event with no intermediate automatic or operator-requested engine-on event. In this way, the timer for the vehicle soak duration may have expired. For example, the timer may expire if the threshold soak duration has elapsed on the timer that was started when the vehicle-off event occurred. As such, if the vehicle remains in the vehicle-off condition for the threshold soak duration since the vehicle-off event, a humidity level in the intake of the engine is expected to stabilize to ambient conditions, and therefore an intake humidity level is also expected to be stable (e.g., not changing and/or at a lower level). Responsive to expiration of the timer, a controller (e.g., controller 12 of FIG. 1) may wake up and estimate or measure current vehicle conditions to determine whether the humidity sensor diagnostic conditions have been met. Responsive to humidity sensor diagnostic conditions being met, the routine includes adjusting one or more engine parameter to reduce the amount of water vapor in the exhaust system from exiting the exhaust system. Then, the routine includes combusting fuel at cylinders (e.g., cylinder 30 of FIGS. 1-2) of the engine while flowing gases through the engine in a first direction, then stopping combusting fuel and flowing gases through the engine in an opposite, second direction. By reducing or preventing the exit of the combustion products from exiting the exhaust system of the engine for the duration of the method, water vapor generated as a byproduct of combustion and expelled by the engine into the exhaust system while flowing gases through the engine in the first direction may be retained and ingested through the a cylinder exhaust valve (e.g., exhaust valve 256 of FIG. 2) when the direction of gases through the engine is reversed and flows in the second direction. In this way, an amount of water vapor may be directed past the humidity sensor positioned in the intake (e.g., intake manifold) of the engine even during arid ambient conditions in order to assess its functionality.

Routine 300 also includes responding to a diagnosed condition of the intake humidity sensor, including degradation, based on a humidity sensor output. In other words, method 300 may comprise performing a type of rationality testing on the intake humidity sensor to ascertain if the intake humidity sensor is accurately estimating humidity levels in the engine intake. In some examples, the intake humidity sensor may be stuck (e.g., indicating one humidity level and not responsive to changes in actual humidity), or may be responsive to changes in actual humidity but not accurate (e.g., overestimates or underestimates humidity levels). By monitoring the response of the humidity sensor during the method, the humidity sensor response (e.g., output) may be compared to an expected (or baseline) sensor response. In this way, degradation of the humidity sensor positioned in the intake manifold of the engine may be indicated in response to the output of the humidity sensor not changing by a threshold amount during flowing the gases in the second direction. In another example, degradation of the humidity sensor may be indicated in response to the change in output of the humidity sensor being outside a threshold of an expected humidity sensor output. Additionally, example routine 300 demonstrates if the humidity sensor is indicated as degraded, subsequent engine operation adjustment (e.g., adjustment of one or more engine parameters) may not be based on the output of the humidity sensor. Conversely, if the humidity sensor is not diagnosed as degraded, subsequent engine operation adjustment may continue to be based on the output of the humidity sensor.

Instructions for carrying out method 300 and the rest of the methods included herein may be executed by a controller (e.g., controller 12 of FIG. 1) based on instructions stored on a memory of the controller and in conjunction with signals received from sensors of the vehicle system (e.g., vehicle system 100 of FIG. 1), such as the sensors described above with reference to FIGS. 1-2. The controller may employ engine actuators of the engine system to adjust engine operation, according to the methods described below.

Routine 300 starts at 302, where the routine includes determining whether the vehicle is off. A vehicle off condition may include the internal combustion engine, motor generator, battery, and controller not operating, and the vehicle is not being propelled. Power and electrical signals may not be conveyed between components of the vehicle. In one example, a vehicle-off event may have occurred in response to one or more of a key-off condition where the vehicle includes an active key, a stop button actuated condition where the vehicle includes an ignition start/stop button, and a passive key being outside a threshold distance of the vehicle where the vehicle includes a passive key. A vehicle-off event may also include an automatic engine-off command from a controller, as may occur in autonomous vehicle embodiments.

If the vehicle is off, the routine proceeds to 303, where the routine includes determining whether a threshold soak duration has elapsed. A threshold soak duration may include when the engine (e.g., engine 10 of FIGS. 1 and 2) remains off for a predetermined amount of time. Specifically, the engine-off duration includes the engine being shut down for a period of time that is greater than a threshold time. It will be appreciated that a threshold soak duration may be based on modeled data, for the elapsed time required for the engine conditions to be within a threshold of ambient conditions. For example, a threshold soak duration may include the amount of time that it takes for the ambient humidity in the intake manifold (as indicated by the output of intake humidity sensor 54) to reach an ambient humidity level external to the vehicle. In other examples, the threshold soak time may be determined responsive to indications of ambient conditions, such as temperature and pressure. If the threshold soak duration has not elapsed, then the routine waits until the threshold soak duration has elapsed.

If the threshold soak duration has elapsed, then the routine proceeds to 304, where the routine includes powering on a controller or power control module (PCM) of the controller (e.g., controller 12 of FIG. 1). In some examples, this may occur responsive to a timer expiration. As previously described, the timer for the threshold soak duration may have expired. For example, the timer may expire if the threshold soak duration has elapsed on the timer that was started when the vehicle-off event immediately preceding the time expiration occurred. This event may be referred to as a PCM wake-up or controller wake-up. Specifically, the controller may be shifted from the sleep mode to a wake-up mode before proceeding to 305.

Additionally, if the vehicle is not off at 302, then the routine proceeds to 305, where the routine includes estimating and/or measuring vehicle conditions. It will be appreciated that if the vehicle is off, vehicle conditions may include predominantly ambient conditions such as ambient temperature, barometric pressure (BP), and ambient humidity, as may be indicated by a humidity sensor positioned in the intake manifold or other location in the intake system of the engine. Other conditions may include angle of incline of the vehicle, as may be indicated by an inclinometer sensor (not shown) or an on-board GPS system, and engine coolant temperature. In this way, the controller may characterize the operating conditions that may exist when the engine is operated as part of the diagnostic. If the vehicle is on at 305, vehicle conditions may also include engine operating conditions, such as whether the engine is operating in electric mode or internal combustion (IC) mode, engine speed (Ne), operator torque demand (Tq), engine boost, and vehicle speed (VS), Other monitored engine operating conditions may include, but are not limited to, accelerator pedal position (PP), an exhaust temperature, a position of an EGR valve, and a current or actual EGR flowrate.

The routine then continues to 306, where the routine includes determining whether the humidity sensor diagnostic entry conditions have been met. In some examples, humidity sensor diagnostic entry conditions may include determining whether an ambient temperature is below a first threshold temperature. Ambient temperature may be estimated using an ambient temperature sensor. In one example, an ambient temperature may be measured or estimated by an intake air temperature sensor, such as IAT sensor 55 of FIGS. 1-2. In an alternate example, the ambient temperature may be measured or estimated by an alternate vehicle temperature sensor, external to the engine. The ambient temperature may be an estimate of a temperature of ambient air surrounding the vehicle in which the engine is installed. In another example, ambient temperature may be the temperature of the environment in which the engine is positioned (e.g., the temperature of air outside of and surrounding the engine). As an example, humidity sensor diagnostic entry conditions may provide conditions suitable for the formation of water vapor via fuel combustion. If ambient temperature is above the first threshold temperature, water vapor from combustion may evaporate and not remain stable for the duration of the diagnostic.

Further humidity sensor diagnostic entry conditions may include an exhaust temperature below a second threshold temperature. In one example, exhaust temperature may be estimated using the output from an exhaust temperature sensor, such as exhaust temperature sensor 128 of FIG. 1. The second threshold temperature may be based empirical data or modeled data and may be a maximum temperature, above which, the water vapor in the exhaust gas may evaporate, which may prevent the water vapor from being used for the diagnostic routine. In this way, the humidity sensor diagnostic routine may be initiated responsive to each of an engine-off duration and an ambient temperature being below a threshold temperature.

It will be appreciated that in hybrid vehicle embodiments, the humidity sensor diagnostic routine may be performed while the vehicle is operating and/or being propelled. In one example, the diagnostic may occur during a cold start condition (e.g., when ambient temperature, engine coolant temperature, and/or engine exhaust temperatures are below respective threshold temperatures, as described above). In these embodiments, particularly when the vehicle is being propelled in an electric mode via an electric motor (e.g. electric machine 72 of FIG. 1), it may be possible to control the internal combustion engine of the hybrid system to perform the humidity sensor diagnostic without affecting vehicle performance or how a user operates the vehicle. In examples such as these, humidity sensor diagnostic entry conditions may include operating the vehicle in electric mode during a cold start condition.

If the humidity sensor diagnostic entry conditions are not met, then the routine proceeds to 307, where the routine determines whether the engine is off. If the engine is not off, the routine continues to 308, where the routine includes maintaining current vehicle operation. Maintaining vehicle operation may include the controller continuing to adjust engine parameters to meet operator torque demand. In one example, this may include the controller continuing to adjust EGR flow responsive to an indication of engine speed and load, as well as to an indication of humidity from the intake humidity sensor (e.g., humidity sensor 54 of FIGS. 1 and 2). The routine then ends.

If the engine is off, then the routine proceeds to 309, where the routine includes powering off the controller. In this way, the controller may return to a sleep mode and the engine may not be turned (e.g., spun, cranked) as part of the diagnostic before the routine ends.

If the humidity sensor diagnostic entry conditions are met, then the routine continues to 310, where the routine includes adjusting a parameter of the vehicle to reduce the amount of water vapor in the exhaust system from exiting the exhaust system. In one example, this may include adjusting the exhaust system of the engine to reduce water or water vapor from escaping out of the exhaust system (e.g., via a tail pipe). In some embodiments, the method may include sealing the exhaust system via the controller sending a command signal to an actuator coupled to an exhaust flow valve (e.g., exhaust tuning valve 291 of FIG. 2) in order to decrease the opening (e.g., close) the exhaust tuning valve. In this way, the exhaust system may be sealed from atmosphere, and water vapor generated as part of the diagnostic may be prevented from exiting the exhaust system. In another example, the method at 310 may include the controller sending a command signal to a suspension system (e.g., suspension system 79 of FIG. 1) to adjust (e.g., tilt) the suspension of the vehicle to be positioned in a nose-facing downward position such that an outlet of the exhaust system is tilted upward relative to a surface on which the vehicle sits. It will be appreciated that a nose-facing downward position may include the front end of the vehicle (e.g., where the engine is located) positioned closer to the ground that the rear of the vehicle.

In other examples, where the engine is installed in an autonomous vehicle, adjusting a parameter of the vehicle to reduce the amount of water vapor in the exhaust system from exiting the exhaust system may include, prior to shutting off the engine and a beginning of the engine-off duration, and in response to a request to perform a diagnostic of the humidity sensor, parking the autonomous vehicle in a nose-facing downward position (or nose-downward position), as shown in FIG. 4. It will be appreciated that by positioning the vehicle in a nose-facing downward position, water vapor generated by fuel combustion may be more likely to remain in the exhaust system and be readily ingested when the flow of gases through the engine is reversed.

Additionally, adjusting a parameter of the vehicle to reduce the amount of water vapor in the exhaust system from exiting the exhaust system at 310 may include disabling the EGR system so that exhaust gases may not be recirculated while the humidity sensor diagnostic is being performed. This may include closing one or more valves coupled to the EGR system (such as EGR valve 258) to reduce the recirculation of exhaust gas and any entrained water vapor. In this way, the controller may adjust a parameter of a vehicle (e.g., vehicle system 100 of FIG. 1) in which the engine is installed to reduce an amount of water vapor in an exhaust system of the engine from traveling downstream and exiting the exhaust system.

At 312, the method includes flowing gases in a forward (e.g., first) direction through the fueled engine for a first duration. Flowing gases in the forward direction may include flowing gases in the direction of airflow through the engine while the engine rotates during nominal operation (e.g., when the engine is propelling the vehicle). Specifically, when flowing gases through the engine in the first, forward direction, gases from the intake system and intake manifold enter cylinders (e.g., cylinder 30 of FIGS. 1-2) of the engine via an intake valve (e.g., intake valve 250 of FIG. 2) and then exit the cylinder to an exhaust manifold (e.g., exhaust manifold 36 of FIGS. 1-2) and exhaust system via an exhaust valve (e.g., exhaust valve 256 of FIG. 2). In this way, during the method at 312, combusted exhaust gases flow from engine cylinders to an exhaust passage of the engine.

In an example that includes a PCM wake-up after a vehicle soak, flowing gases in a forward direction may include the controller sending a signal to a starter motor (e.g., starter motor 272 of FIG. 2) coupled to a crankshaft (e.g., crankshaft 40 of FIGS. 1-2) of the engine in order to crank, or spin, the engine in a forward direction as previously described in reference to FIG. 2. In an example that includes a hybrid vehicle, flowing gases in a forward direction may also include the controller sending a signal to a starter motor or a motor generator (e.g., starter motor 272 or FIG. 1 or motor generator 72 of FIG. 1) in order to crank, or spin, the engine in a first, forward direction. Hybrid vehicle embodiments may further include performing the diagnostic while the vehicle is operated entirely or partially in electric mode (e.g., receiving motive power from batteries, such as battery 75 of FIG. 1, and not the internal combustion engine). In this way, the internal combustion engine may run in a forward direction without affecting vehicle's operation in electric mode.

It will be appreciated that the gases being flowed through the engine may be a mixture and comprise one or more of fresh intake air and exhaust gas. Because the EGR system may be disabled during the diagnostic, it will be appreciated that in some examples, exhaust gas in the intake manifold may be EGR flow that entered the intake manifold prior to the start of the diagnostic.

At 312, the method additionally includes running the engine fueled. Specifically, fuel is being delivered to cylinders of the engine from a fuel system (e.g., fuel system 208 of FIG. 2). In some examples, this may include fuel being introduced directly to the cylinder via a direct fuel injector (e.g., fuel injector 66 of FIGS. 1-2) and/or a port fuel injector (e.g., port fuel injector 67 of FIG. 1). Further, spark is being delivered to cylinders of the engine from an ignition system (e.g., ignition system 290 of FIG. 2). In some examples, this may include spark being introduced directly to the cylinder via a spark plug (e.g., spark plug 292 of FIG. 2). By delivering fuel and spark to the cylinder of the engine in this way, combustion may occur in each of the cylinders. It will be appreciated that in compression ignition engine embodiments, combustion may occur without the introduction of spark. As a result of combustion, water vapor may be generated as a byproduct of the combustion. In a simplified example, water vapor ($H_2O$) may be generated by combustion according to the following equation:

$$CH_4 + O_2 \rightarrow CO_2 + H_2O$$

where C is carbon, H is hydrogen and O is oxygen. The right-hand side of the equation shows two products of combustion: carbon dioxide and water, which may be in the form of water vapor. The gases may flow through the fueled engine in the forward direction for a first duration.

In some examples, the first duration may be based on an amount of time required to generate a threshold amount of water vapor in the exhaust while rotating the engine in the first direction and combusting fuel. Specifically, the first duration may be the amount of time to execute a predetermined number of cylinder combustion events to generate the threshold quantity of water vapor. In other examples, the first duration may be based on a monitored exhaust gas temperature, as may be indicated by exhaust temperature sensor 128 of FIGS. 1 and 2. Therein, the first duration may end when the exhaust gas temperature exceeds an upper threshold, which may be based upon the temperature of exhaust gases that causes any entrained water vapor to boil off. This will be described further below in reference to FIGS. 5-6.

It will be appreciated that in some examples, the threshold amount of water vapor may not be limited to a specific quantity of water vapor, but that the threshold quantity of water vapor may be a quantity of water vapor sufficient to elicit a response from the humidity sensor positioned in the intake manifold of the engine that would be different than the reduced humidity condition (e.g., ambient air without the additional water vapor from combustion).

The threshold amount of water vapor may be determined using empirical or test data and based on a look-up table based on the first duration (as described above in reference to 312) and/or additional conditions. For example, the threshold amount of water vapor may be a set level that may be based on the length of the first duration. Specifically, the look-up table may be based on experimental testing or empirical data that establishes a correlation between the duration of combustion and/or number of combustion cycles and the quantity of water vapor produced as a result of the combustion. Additional factors that may impact the amount of water vapor generated may include, but are not limited to, ambient humidity and ambient temperature. It will be appreciated that these and other factors may also be included in the look-up table.

In other examples, the threshold amount of water vapor (generated during the method at 312) may be estimated based on an output of an exhaust oxygen sensor, such as exhaust gas sensor 127, while combusting fuel and rotating the engine in the forward direction. In still further examples, the threshold amount of water vapor may be estimated using a diesel oxidation catalyst (DOC). In one example, the temperature and/or the exotherm across the DOC may be used to estimate the threshold amount of water vapor.

While exhaust gases are flowing through the engine in the first direction, the humidity in the intake manifold may be monitored using the humidity sensor positioned in the intake manifold. It will be appreciated that after a vehicle soak greater than a threshold soak, or immediately after a cold start, the humidity at a location proximate the intake manifold (as sensed by the humidity sensor in the intake manifold) may be expected to be within a threshold of an ambient humidity, external to the vehicle, and thus lower than the humidity of combusted exhaust gases generated during combusting fuel at the engine cylinders.

At the end of the first duration, combustion stops and the engine is no longer actively cranked, or spun, in the forward direction. In some examples, stopping combustion may include the controller sending a command signal to one or more of a fuel system and an ignition system to withhold fuel and/or spark from the cylinders of the engine, thus the crankshaft may no longer be actively rotated as a result of combustion forces. Further, stopping active cranking of the engine crankshaft may also include stopping cranking the engine via a starter motor.

At 314, the routine includes waiting a threshold duration (e.g., threshold wait duration) before reversing the flow of gases through the engine. In one example, the threshold duration may be zero seconds. In other examples, the threshold duration may be greater than zero seconds, such as in a range of 1-5 seconds. It will be appreciated that during the wait duration, no other engine cranking occurs, and no additional combustion occurs in the cylinders. In one example, when the direction of engine rotation is reversed between 312 and 316, as described further below, the threshold wait duration may provide a suitable amount of time to allow the inertia of the crankshaft of the engine to stop before reversing its direction of rotation. In other examples, the threshold wait duration may include a suitable amount of time to allow decoupling of engine components that may not be configured to rotate in a reverse direction. In one example, an air conditioning compressor may not be configured to rotate in a reverse direction and a duration of time may allow for decoupling of the air conditioning compressor or other engine component in order to reduce the likelihood of component damage. It will be appreciated that the EGR system may remain disabled during 314, preventing recirculation of exhaust gas from the exhaust passage to the intake passage. In this way, the flowing of gases through the engine in the second direction occurs within a threshold duration of stopping combusting fuel at the cylinders and flowing gases through the engine in the first direction.

After the threshold wait duration has elapsed, the routine proceeds to 316, where the method includes flowing gases in a second, reverse direction through the engine, while not fueling the engine (and thus not combusting fuel at the engine cylinders), for a second duration while monitoring the humidity sensor response (e.g., the output of the humidity sensor). In one example, the second, reverse direction may be opposite the first, forward direction and thereby, also opposite the direction that air flows through the engine when the engine rotates during nominal engine operation (e.g., when the engine is being propelled). Specifically, flowing gases in the second, reverse direction includes flowing gases (e.g., exhaust gases) from the exhaust system (e.g., exhaust passage and/or manifold), to the cylinders of the engine via the cylinder exhaust valves, and then to the intake manifold via the cylinder intake valves. As previously described, the exhaust gases entering the cylinders through the exhaust valves may be a mixture of combustion products (e.g., those generated at 312), which may include carbon dioxide and water vapor, in two non-limiting examples. It will be appreciated that flowing gases in the reverse direction through the engine may be achieved using a plurality of methods. In one example, the rotation of the crankshaft may be reversed, causing the camshaft and valve timing to also be reversed. This may causes gases to flow in a reverse direction though cylinders of the engine. In another example, the valve timing may be adjusted without reversing the direction of rotation of the crankshaft in order to reverse the flow of gases through the engine. Simplified and relative valve opening relationships are shown below for each flow direction:

|  | Piston Stroke | |
| --- | --- | --- |
|  | Forward Flow Intake Valve/ Exhaust Valve | Reverse Flow Intake Valve/ Exhaust Valve |
| Intake | Open/Closed | Closed /Open |
| Compression | Closed/Closed | Closed/Closed |
| Expansion | Closed/Closed | Closed/Closed |
| Exhaust | Open/Closed | Closed /Open |

Further, because the EGR system may remain disabled during the diagnostic, exhaust gas may not be recirculated through the EGR passage (e.g., EGR passage 270 of FIG. 2).

The crankshaft may have stopped during the method at 314, and the starter motor may not be rotating. In an example that includes a PCM wake-up after a vehicle soak, flowing gases in a reverse direction may include the controller sending a signal to the starter motor coupled to a crankshaft of the engine in order to crank, or spin, the engine in a reverse direction. As previously described, an H-bridge circuit may be coupled to the starter motor to facilitate reversal of the starter motor. In one example, the H-bridge circuit may include four controllable switches that allow reversal of the polarity of the current flowing in the motor when the switches are selectively actuated. In this way, the starter motor may spin in a reverse direction, causing a flywheel (e.g., flywheel 262 of FIG. 2) and the crankshaft to also rotate in a reverse direction.

Combustion is not occurring at 316. In some examples, this may include the ignition system (e.g., ignition system 290 of FIG. 2) being selectively controlled not to deliver spark via the spark plugs coupled to each cylinder. In other examples, 316 may include not delivering fuel to cylinders of the engine from the fuel system. In some examples, this may include fuel not being introduced directly to the cylinder via the direct fuel injector or the port fuel injector. By not delivering fuel and/or spark to the cylinders of the engine in this way, combustion may not occur in the cylinders. As a result, the gases may flow through the unfueled engine in the reverse direction, from the exhaust to the intake, for a second duration. The second duration may be based on the amount of time for the humidity sensor in the intake manifold to sense the threshold quantity of (or an entirety of) the water vapor generated at 312. In one example, the second duration may include the amount of time (e.g., the rotational time), or the number of crankshaft rotations, required to pass the threshold quantity of water vapor from the exhaust manifold, through the cylinders of the engine, and past the humidity sensor. In this way, the second duration may either be a set value or an adjustable value that is based on the first duration at 312, an estimate of the amount of water generated in the exhaust during the method at 312, and/or the number of combustion events at 312, with the second duration increasing as one or more of these variables increases. In one embodiment, the controller may determine the second duration based on a number of completed non-combusting engine cycles. For example, responsive to an indication of a profile ignition pickup signal (PIP) from a sensor (e.g., Hall effect sensor 220 of FIG. 2) that the engine has completed a predetermined number of engine cycles, the controller may send a command signal to a starter solenoid of a starter motor to stop cranking the engine in the reverse direction.

While exhaust gases are flowing through the engine in the reverse direction, the humidity in the intake may be monitored using the humidity sensor positioned in the intake. It will be appreciated that while flowing the combustion gases through the engine and back through the intake manifold, the humidity at a location proximate the intake manifold (as sensed by the humidity sensor in the intake manifold) may be expected to be greater than a threshold above ambient humidity, as the additional water vapor from the exhaust being introduced to the intake manifold is expected to generate an increased humidity response, indicative of a greater amount of water vapor retained in the gases flowing past the sensor.

The routine then continues to 318, where the routine includes determining whether the humidity sensor response is within one or more thresholds. In one example, the humidity sensor response being within a first threshold may include an absolute difference (e.g., change) in output of the intake humidity sensor between when gases flow through the engine in a forward direction (while combusting fuel) at 312, and when gases flow through the engine in a reverse direction (without combusting fuel) at 316 being greater than a first threshold difference. Specifically, the intake humidity sensor output when the gases flow through the engine in the reverse direction is expected to be more than a first threshold difference greater than the intake humidity sensor output when the gases flow through the engine in the forward direction. It will be appreciated that the first threshold difference may be a non-zero threshold difference. This may occur because the output of the humidity intake sensor when gases flow through the engine in the forward direction may be equal or approximately equal to an ambient humidity condition, and the output of the humidity intake sensor when gases flow through the engine in the reverse direction may additionally include water vapor that was generated as a result of combustion occurring while the engine was rotated in the forward direction at 312. In this way, the humidity sensor output while flowing gases through the engine in a reverse direction is expected to be at least a first threshold amount greater than the humidity sensor output while flowing the gases through the engine in the forward direction.

In another example, the humidity sensor response being within a threshold may include the change in output of the humidity sensor being within a second threshold of an expected humidity sensor output, where the expected humidity sensor output is determined based on the threshold amount of water vapor generated at 312. In some examples, the controller may compare the output of the humidity sensor while flowing gases through the engine in the reverse direction to an expected humidity sensor output based on the threshold amount of water vapor generated at 312 (from a look-up table, for example). In this way, for the threshold amount of generated water vapor, an actual humidity sensor output may be expected to be within the second threshold of the expected humidity sensor response for the threshold amount of water vapor moved past the humidity sensor. The second threshold may be an allowable or acceptable error between the expected humidity sensor output and the actual humidity sensor output. In one non-limiting example, the actual humidity sensor output may be expected to be within +/−5% of the expected humidity sensor output. If the measured and expected humidity values are within the second threshold, the controller may determine that the humidity sensor is functioning as desired and deem it not degraded. Conversely, if the measured and expected humidity values are not within the second threshold, the controller may determine that the humidity sensor is not functioning as desired, and deem it degraded.

As previously described, the amount of water vapor generated at 312 may be estimated based upon one or more of the length of combustion (e.g., number of combustion events) while running the engine in the forward direction, ambient temperature, ambient humidity, and air fuel mixture composition. Further methods of estimating the threshold amount of water vapor generated at 312 include estimating the amount of water vapor generated using the output of the exhaust oxygen sensor (e.g., exhaust gas sensor 127 of FIGS. 1 and 2) or using the exotherm or temperature data from the diesel oxidation catalyst (DOC).

Humidity sensor degradation may be indicated if the humidity sensor response falls outside the aforementioned threshold(s). For example, degradation of the humidity sensor positioned in the intake may be indicated in response to the output of the humidity sensor not changing by more than the first threshold amount between when flowing the gases through the engine in a first (e.g., forward) direction and when flowing the gases through the engine in the second (e.g., reverse) direction. In other examples, degradation of the humidity sensor positioned in the intake may be indicated in response to the change in output of the humidity sensor being outside the second threshold of an expected humidity sensor output, where the expected humidity sensor output is determined based on the threshold amount of water vapor. If the humidity sensor response is not within the one or more set or determined thresholds, then the routine proceeds to 320, where a parameter of the vehicle may be adjusted to allow exhaust to exit the exhaust system. In some examples, this may include reversing the parameter adjustment of 310. In embodiments that include an exhaust tuning valve, adjusting a parameter of the vehicle to allow exhaust, including water vapor, to exit the exhaust system. This may include the controller sending a signal to an actuator of the exhaust tuning valve to increase the opening of the exhaust tuning valve and allow exhaust gases to leave the exhaust system and flow to atmosphere. In some examples, the exhaust tuning valve may be opened fully. In embodiments that include adjustable suspension, adjusting a parameter of the vehicle to allow exhaust to exit the exhaust system may include tilting the suspension of the vehicle to bring the vehicle out of a nose-facing downward position. In some examples, this may include adjusting the suspension to bring the vehicle to more level position. In embodiments that include an autonomous vehicle, adjusting a parameter of the vehicle to allow exhaust to exit the exhaust system may include automatically moving the vehicle from a parking position in which the vehicle is in a nose-facing downward position to a parking position that may be more suitable for the vehicle operator, such as proximate a building or in a driveway.

The routine then continues to 322, where the routine includes indicating humidity sensor degradation. In one example, indicating humidity sensor degradation may include setting a diagnostic flag or code indicating that the humidity sensor is degraded and/or not reading accurately. In some examples, indicating humidity sensor degradation may include the controller performing one or more of setting a diagnostic flag and alerting a vehicle operator. Alerting a vehicle operator may include the controller sending a command signal to illuminate a malfunction indicator light (MIL) on a display panel inside a passenger compartment of the vehicle.

Responsive to an indication of humidity sensor degradation, the routine continues to 324, where, upon and during subsequent operation of the engine, engine parameters may be adjusted without relying on the intake humidity sensor output. Instead, engine parameters may be adjusted based on an alternate humidity estimate. Specifically, this may include adjusting engine operating parameters during future engine operation not based on a humidity estimate that is determined based on the output from the humidity sensor positioned in the intake manifold of the engine, but instead based on an alternate humidity estimate. In some examples, the alternate humidity estimate may be an estimate of maximum relative humidity, which may be determined based on ambient pressure and ambient temperature conditions. In another example, the alternate humidity estimate may be a set, upper threshold humidity value, such as a 100% humidity level. By basing control of engine parameters on an estimate of the maximum relative humidity, the likelihood of condensation at the inlet and outlet of the turbocharger compressor, as well as the charge air cooler outlet and other components may be avoided.

In one non-limiting example, responsive to an indication of intake humidity sensor degradation, the controller may send a command signal to an actuator of the EGR valve in order to adjust the EGR valve to achieve a target EGR flow based on an assumption that ambient, or relative humidity, is at its maximum value. The maximum value of ambient or relative humidity may come from a look-up table based on ambient temperature and pressure or may be assumed to be 100% humidity. By adjusting the delivered EGR based on the assumption of maximum (e.g., 100%) relative humidity, the likelihood of condensation in the engine system (e.g., at the compressor and in the EGR system) may be reduced. In other words, an EGR valve may be adjusted based on an EGR flow estimate that is based on the set upper threshold ambient humidity level. In other examples, responsive to an indication of intake humidity sensor degradation, an EGR flow rate (e.g., an actual flow rate of EGR entering the intake passage or intake manifold) may be estimated using an alternate method. In one example, the alternate method may include using a differential pressure sensor (not shown) positioned in the intake passage or intake manifold to estimate the actual EGR flow rate. In some embodiments, EGR flow may be scaled back (e.g., reduced) responsive to an indication of a degraded humidity sensor (e.g., the intake humidity sensor) so that the humidity may be estimated using feedback following combustion events. In this way, the controller may "learn" the humidity of the intake air. In one example, as the controller commands an increase in EGR flow, oxygen levels of exhaust gas from the engine may be monitored using an oxygen sensor positioned in the exhaust system of the engine. As the EGR increases slowly, if the controller determines that the output of the oxygen sensor indicates a lean combustion condition that is leaner than a threshold, the controller may command a decrease in EGR flow.

In another example, the routine may include adjusting the amount of fuel injection based an alternate estimate of relative humidity, and not on the estimate of relative humidity using the output of the intake humidity sensor. For example, the controller may make a logical determination (e.g., regarding operation of a fuel injector, such as fuel injector 66 of FIGS. 1-2) based on logic rules that are a function of an estimate of relative humidity. Responsive to an indication of degradation of the intake humidity sensor, the estimate of relative humidity may be the maximum relative humidity. In one example, the amount of fuel delivered via port and/or direct fuel injectors is empirically determined and stored in predetermined look up tables or functions. For example, one table may correspond to determining port injection amounts and one table may correspond to determining direct injections amounts. The two tables may be indexed to engine operating conditions, such as relative humidity, engine speed, and engine load, among other engine operating conditions. Furthermore, the tables may output an amount of fuel to inject via port fuel injection and/or direct injection to engine cylinders at each cylinder cycle. After 324, the routine ends.

If the humidity sensor response is within the threshold(s) defined at 316, the routine continues to 326, where a parameter of the vehicle may be adjusted to allow exhaust to exit the exhaust system. In some examples, this may include reversing the parameter adjustment of 310. As previously described, in embodiments that include an exhaust tuning valve, opening the exhaust system may include the controller sending a signal to an actuator of the exhaust tuning valve to increase the opening of the exhaust tuning valve. In some examples, the exhaust tuning valve may be opened fully. In embodiments that include adjustable suspension, opening the exhaust system may include tilting the suspension of the vehicle to bring the vehicle out of a nose-facing downward position. In some examples, this may include adjusting the suspension to bring the vehicle to more level position. In embodiments that include an autonomous vehicle, opening the exhaust system may include automatically moving the vehicle from a parking position in which the engine is installed in a nose-facing downward position to a parking position that may be more suitable for the vehicle operator, such as proximate a building or in a driveway.

At 328, the routine includes indicating that the humidity sensor is not degraded. In one example, this may include the controller logging that the humidity sensor "passed" the diagnostic test, or it may include the controller setting a timer scheduling a subsequent diagnostic. As a result, during engine operation after the completion of the diagnostic, engine parameters may continue to be adjusted based on output from the humidity sensor positioned in the intake (e.g., intake humidity sensor). Specifically, the position of one or more EGR valves may be adjusted to provide the desired EGR amount based on the humidity equivalent EGR amount calculated from the output of the humidity sensor. The one or more EGR valves that are adjusted may include one or more of the EGR throttle valve, the LP-EGR valves (for adjusting an amount of LP-EGR provided), and the HP-EGR valves (for adjusting an amount of HP-EGR provided). Specifically, the position of the one or more EGR valves may be adjusted to provide the difference in EGR amount (e.g., using exhaust gas and/or intake air). In one example, the relative humidity may be 40%, as may be indicated by the output of the humidity sensor positioned in the intake manifold. The engine may be calibrated at the specified humidity and the amount of scheduled EGR may be increased or decreased based on the amount of water over or under the base water concentration at the specified humidity level (e.g., 40%).

In another example, at 328, the routine may include continuing to adjust the amount of fuel injection based on relative humidity, as may be estimated using the output of the intake humidity sensor. For example, the controller may determine a control signal to send to the fuel injector actuator, such as a pulse width of the signal being determined based on a determination of the relative humidity. The controller may determine the pulse width through a determination that directly takes into account a determined relative humidity, such as increasing the pulse width with increasing humidity. The controller may alternatively determine the pulse width based on a calculation using a look-up table with the input being relative humidity and the output being pulse-width. After 328, the routine ends.

In this way, a method for an engine includes: responsive to an engine-off condition and an ambient temperature less than a temperature threshold: rotating the engine in a first direction while combusting fuel for a first duration; within a threshold duration after the first duration ends, rotating the engine in an opposite, second direction without fueling the engine; and indicating a condition of a humidity sensor positioned in an intake of the engine, upstream of engine cylinders, in response to a change in output of the humidity sensor during the rotating the engine in the first and second directions.

Turning now to FIG. 4, it shows an example embodiment of a control routine 400 for initiating the intake manifold humidity sensor diagnostic of FIG. 3 in an autonomous vehicle. For example, in some embodiments, the vehicle system (such as the vehicle systems shown in FIGS. 1 and/or 2) may be an autonomous vehicle, also known as a driverless car, or self-driving car. An autonomous vehicle is a vehicle that may be capable of sensing its environment using output from a plurality of sensors and navigating and propelling the vehicle without operator input. In some examples, navigating and propelling the vehicle without operator input may include one or more of turning the vehicle without an operator actuating a steering wheel, accelerating the vehicle without an operator actuating an accelerator pedal, and slowing the vehicle without an operator actuating a brake pedal of the vehicle.

Routine 400 starts at 402, where the routine includes estimating and/or measuring engine operating conditions of the autonomous vehicle. Engine operating conditions may include engine speed (Ne), torque demand (Tq), engine coolant temperature (ECT), barometric pressure (BP), engine boost, vehicle speed (VS), ambient temperature, and ambient humidity, as may be indicated by a humidity sensor positioned in the intake manifold or other suitable location. Other monitored engine operating conditions may include, but are not limited to, accelerator pedal position (PP), an exhaust temperature, and EGR flowrate.

The routine then continues to 404, where the routine includes determining whether the humidity sensor diagnostic has been requested at the next start-up. In one example, a request for performing the humidity sensor diagnostic may occur as a result of a threshold duration having elapsed since the previous humidity sensor diagnostic was performed. In another example, the humidity sensor diagnostic described herein may be automatically performed at each engine start-up, as long as the expected engine-off duration is longer than a threshold (e.g., long enough to reduce engine temperatures to ambient temperature and reduce humidity within the engine system). In some embodiments, the humidity sensor diagnostic may be requested when the output of the humidity sensor remains stuck in a threshold range for more than a threshold duration. This may include the humidity sensor producing a low output value that is unresponsive to changes in actual humidity. Further examples may include initiating or requesting the humidity sensor diagnostic responsive to a crowd comparison with other vehicles, where the mean humidity sensor output from other nearby vehicles may differ from the output of the humidity sensor of the subject vehicle by more than a threshold amount. Crowd comparison with other vehicles may be performed using vehicle-to-vehicle (V2V) technology, where the controllers of respective vehicles may communicate with one another and share data. In still other examples, the humidity sensor diagnostic may be initiated or requested responsive to the controller comparing the output of the humidity sensor with weather data, including ambient humidity, which may be collected from nearby networks, such as weather stations. The vehicle controller may communicate with the nearby networks using what is known as vehicle-to-infrastructure, or V2X technology.

If the controller does not receive a request to perform the humidity sensor diagnostic at the next start up, then the routine proceeds to 406, where the routine includes maintaining current engine operating conditions. In one example, this may include adjusting engine operation in order to meet an operator torque demand. In other examples, this may include continuing to operate a level of EGR responsive to one or more of an engine load, an engine speed, and an output of the humidity sensor positioned in the intake manifold. Using the output of the intake humidity sensor, the controller may determine a quantity of EGR that is equivalent to the relative humidity, as estimated by the humidity sensor positioned in the intake manifold, downstream of the EGR valve. Specifically, using the water vapor concentration of the intake air, an accurate indication of the equivalent EGR amount may be generated by utilizing a mass balance formula. Based on the determined humidity equivalent EGR amount, a position of the EGR valve is adjusted to provide the desired EGR flow. In this way, EGR may be controlled to minimize auto ignition and reduce emissions. Further, upon the next request to park the vehicle, parking may be executed in any position (e.g., not limited to a nose-facing downward position).

If the controller does receive a request to perform the humidity sensor diagnostic at the next start up, then the routine proceeds to 408, where the routine includes determining whether there has been a request to park the autonomous vehicle. In one example, a request to park the autonomous vehicle may include the controller receiving an operator request to move the vehicle from a start location to a destination, wherein upon arriving at the destination, the autonomous vehicle my automatically park in a recognized parking space, or park in a specific location as requested by the operator (e.g., parallel, on-street parking, handicapped parking, parking garage, valet, etc). In this way, a request to park the autonomous vehicle may be a specific request or an automatic event included in arriving at a destination (e.g., according to a known route).

If no request to park the vehicle has been received, then the routine continues to 409, where the method includes maintaining current engine operation without parking. In one example, this may include the vehicle controller continuing to adjust EGR flow rates based on an input from the humidity sensor positioned in the intake manifold and sending a control signal to an actuator of an EGR valve in order to adjust the EGR flow rate responsive to humidity levels and other engine operating conditions. The method then returns and waits until a request to park the vehicle has been received at 408.

If a request to park the vehicle has been received then the routine continues to 410, where the routine includes parking the vehicle in a nose-facing downward position, relative to a surface on which the vehicle sits. Specifically, a nose-facing downward position may include the nose (e.g., front end) of the vehicle, where the engine is typically located, being positioned vertically lower than the back end of the vehicle relative to a surface on which the vehicle sit. In one example, this may include the autonomous locating an inclined parking location and parking in it. In another example, this may include the autonomous vehicle using its onboard inclinometer in the Restraint Control Module (or GPS) to seek and advantageously park the vehicle on an inclined parking surface such that the vehicle is in a nose-facing downward position. In one example, this may include the vehicle automatically moving to and parking in an entrance to a driveway, or an on-street parking position on an inclined street such that the nose of the vehicle is positioned vertically lower than the back end of the vehicle relative to the surface on which the vehicle is parked prior to shutting down the engine and turning off the vehicle. In this way, gravity may assist retaining the water vapor generated during the humidity sensor diagnostic to remain inside the exhaust system. The routine then continues to 412, where the routine includes shutting down (e.g., turning off) the engine and the vehicle. This may include the controller sending a command signal to the ignition system and fuel system of the vehicle to stop delivery of spark and/or fuel to cylinders of the engine. As a result, the engine may stop combustion and rotation, and the controller may then power off, or enter a sleep mode as previously described. After the engine and vehicle are off, the routine continues to 414, where the routine includes starting routine 300 of FIG. 3. Routine 300 includes initiating a humidity sensor diagnostic responsive to humidity sensor diagnostic entry conditions being met. As described above in reference to FIG. 3, humidity sensor diagnostic conditions may include a vehicle soak longer than a threshold duration, and an ambient temperature lower than a threshold temperature, as two non-limiting examples. It will be appreciated that after the completion of the humidity sensor diagnostic, the autonomous vehicle may automatically re-park, or reposition itself in a designated position or return to its previously commanded mission.

Turning now to FIG. 5, it shows an example operation map 500 of an engine performing a diagnostic of an intake humidity sensor positioned in the intake of an engine during a PCM wake-up, and subsequent engine operation, such as the diagnostic routine 300 of FIG. 3. Map 500 includes various engine parameters along the vertical axis, and elapsed time along the horizontal axis. Map 500 depicts ambient temperature at plot 502 and accelerator pedal position (PP) at plot 504, which is indicative of operator torque demand. Map 500 further depicts a PCM wake-up mode at plot 506, and the direction of engine rotation at plot 508. Fuel delivery to engine cylinders is shown at plot 510, and an absolute engine speed (RPM) is shown at plot 512. Further, exhaust temperature is shown at plot 514, and the output of the humidity sensor positioned in the intake manifold (e.g., intake humidity sensor such as sensor 54 shown in FIGS. 1-2) of the engine is shown at plot 516. A flag indicative of degradation of the intake humidity sensor is shown at plot 518, and an EGR flow is shown at 520.

Prior to time t1, the engine is off (due to the vehicle being turned off) and so the engine has a speed of zero (plot 512). The ambient temperature is above a threshold temperature (dashed line 501), and so the intake humidity sensor diagnostic (e.g., routine 300 of FIG. 3) may not be initiated. At time t1, the ambient temperature drops below the threshold temperature depicted by dashed line 501 and so the intake humidity sensor diagnostic may be performed. It will be appreciated that at time t1, the vehicle may have also achieved a vehicle soak (e.g., engine off) duration for longer than a threshold soak duration, and that the exhaust system may have been sealed, and the EGR system may have been disabled from recirculating exhaust gas (as previously described). At time t1, the PCM wakes up (plot 506), and engine is rotated (via cranking) in a forward direction (plot 508) at an absolute engine speed (plot 512) that may be less than an idle speed (dashed line 513). Fuel is delivered to cylinders of the engine (plot 510) and the combusted exhaust gases are exiting the cylinders into the exhaust system (e.g., exhaust manifold 36, exhaust passage 35 of FIGS. 1 and 2) for a first duration D1. It will be appreciated that at time t1, the exhaust system may be sealed as previously described to prevent exhaust gas (and any entrained water vapor) from exiting the exhaust system. The first duration D1 may be defined as time t1-t2 and may be determined based on a number of combustion events (tick marks 507), in one example. As shown in FIG. 5, the first duration lasts for nine cylinder combustion events (inclusive of the first and last combustion events at t1 and t2, respectively) where a cylinder combustion event is defined as an the event when the cylinder of the engine is fired (e.g., fuel is ignited in the cylinder). The first duration may be based on an amount of time required to generate a threshold amount of water vapor in the exhaust while rotating the engine in the first, forward direction and combusting fuel. In other examples, the first duration may be based upon an exhaust temperature (plot 514), which may gradually increase during the first duration. Specifically, if the exhaust temperature (plot 514) reaches an upper threshold temperature (dashed line 513) the first duration may end. Specifically, responsive to the controller receiving an indication (e.g., output) from exhaust temperature sensor (e.g., exhaust temperature sensor 128 of FIGS. 1 and 2) that the exhaust gas temperature is above the upper threshold temperature 513, the controller may send a command signal to a fuel system (e.g., fuel system 208 of FIG. 2) and/or an ignition system (e.g., ignition system 290 of FIG. 2) to stop delivering fuel and/or spark, respectively, to cylinders of the engine. In other examples, responsive to the controller receiving an indication that the exhaust gas temperature is above the upper threshold temperature, the controller may send a command signal to the actuator solenoid of the starter motor to stop cranking the engine. In this example, if exhaust temperature increases above the upper threshold temperature (dashed line 513), the water vapor in the exhaust may evaporate rather than remaining vapor for the duration of the diagnostic). Thus, at time t2, in response to one or more of a threshold water vapor amount being generated, a temperature of the exhaust system reaching an upper threshold temperature, and an ambient temperature reaching a threshold, the first duration may end, wherein fuel and/or spark delivery to the cylinders may end and any active cranking of the engine may stop. In this way, the engine may start to decrease the speed of rotation in a forward direction (plots 508 and 512) toward a zero speed. The exhaust temperature may not continue to increase (plot 514).

During the first duration, the humidity sensor positioned in the intake manifold may monitor the level of water vapor in the air entering the intake manifold (plot 516). In the depicted example, the intake humidity sensor may generate an output that is approximately equivalent to ambient humidity (dashed line 519).

Between time t2 and t3 exists a threshold wait duration, which is a duration between running the engine in the forward direction while combusting fuel at the cylinders and running the engine in the reverse direction while not combusting fuel in the cylinders. In one example, the threshold wait duration may be an amount of time needed to allow the engine to stop rotating in the first, forward direction and come to a stop. In this way, the threshold wait duration may comprise a "wind down" of the engine. In another example, the threshold wait duration may additionally or alternatively be an amount of time for decoupling engine components from the engine that may not be operated in reverse (e.g., transmission oil pump and/or air conditioning compressor). It will be appreciated that the threshold wait duration may be just a few seconds. The threshold wait duration (e.g., threshold duration) may be short enough that the exhaust temperature and/or engine temperature does not increase above a temperature level where the water vapor produced during the first duration D1 evaporates. Additionally, the threshold wait duration may be short enough to prevent an excess amount of exhaust gas entering the sealed exhaust system.

At time t3, the PCM is still awake (plot 506), and the engine is operated in reverse (plot 508) at an absolute engine speed (plot 512) that may be lower than an idle speed (dashed line 513) for a second duration D2. In one example, operating the engine in reverse may include cranking the engine in a reverse direction that is opposite the forward direction (which the engine rotated in during the first duration D1). Fuel is not delivered to cylinders of the engine (plot 510) during the second duration, while the engine is operated in the reverse direction. Combustion is also not occurring for the second duration, while running the engine in the reverse direction. In this way, the method includes stopping combusting fuel and flowing gases through the engine in the second direction within a threshold duration of combusting fuel at the cylinder while flowing gases through the engine in the first direction. The second duration may be defined as time t3-t4, and may be determined based on a desired number of engine events (tick marks 509), which may include non-combustion engine (e.g., piston) strokes, in one example. In the depicted example, the second duration D2 includes nine engine events (inclusive of the first and last engine events during D2 at t3 and t4, respectively). In one example, an engine event may include a piston reaching TDC every 720 crank angle degrees. In some examples, the second duration may be determined (via the controller) based on a threshold rotational time to flow the generated threshold amount of water vapor past the humidity sensor. For example, the second duration may be an amount of time required to flow the water vapor generated in the exhaust passage during the first duration back through the engine cylinders to the intake manifold and intake humidity sensor. In other examples, the second duration may end when an expected response of the intake humidity sensor is observed by the controller, or when the second duration D2 has elapsed. The second duration D2 may be based on the amount of time to flow the threshold amount of water vapor from the exhaust system to the intake system and past the humidity sensor positioned in the intake system. In one example, responsive to the controller receiving an indication (e.g., output) from the intake humidity sensor while flowing gases through the engine in the reverse direction that is within a threshold of an expected intake humidity sensor response for a given amount of water vapor, as may be indicated by a look-up table based on the amount of water vapor being passed by the humidity sensor, the controller may send a signal to the actuator (e.g., solenoid) of the starter motor to stop cranking the engine in the reverse direction. At time t4, the second duration ends, and the engine may stop rotating in the reverse direction (plots 508 and 512).

The humidity sensor continues to monitor the humidity level in the intake manifold (plot 516) during the second duration from time t3-t4. In the depicted example, the humidity sensor may exhibit a degradation mode that includes the sensor being stuck in a relatively constant level that doesn't change. Specifically, this may include the humidity sensor producing a low output value that is unresponsive to changes in actual humidity. As a result of operating the engine in reverse, the combustion gases (which may include a threshold amount of water vapor) generated between time t1 and t2 and that was "stored" in the exhaust system as a result of sealing the exhaust system, may be flowed in a second, reverse direction from the exhaust passage, through the cylinders, and to the engine intake via rotating the engine in the reverse direction. Responsive to the increase in water vapor passing the intake humidity sensor, the response (e.g., output) of the intake humidity sensor is expected to increase between t3 and t4, as shown by dashed plot 517. Instead, as a result of being degraded, the intake humidity sensor output is unresponsive to the increase in water vapor passing the humidity sensor and does not change (plot 516) between t3 and t4.

At t4, the second duration ends and so does the diagnostic. The engine may stop rotating in the reverse direction (plots 508 and 512) and a flag indicative of probable degradation of the humidity sensor positioned in the intake manifold may be set at the controller (plot 518). Additionally, the PCM may return to sleep mode (plot 506).

At time t5, the engine is started, as may occur responsive to an operator requesting to start the vehicle. In one example, this may include an operator actuating a key to actuate the starter motor and crank the engine. At time t5, the engine may rotate in a forward direction (plot 508) while combusting fuel (plot 510) at an idle speed (plots 512 and 513). The exhaust temperature may being to increase (plot 514) as a result of the combustion. Shortly before time t6, the operator may request torque, as indicated by accelerator pedal position (plot 504). As a result, the fuel to the cylinders may increase (plot 510), the absolute engine speed may increase (plot 512), and the exhaust temperature may continue to increase (plot 514). Because the humidity sensor is "stuck," its output may not change at or after t6.

At time t6, exhaust gas recirculation (EGR) may be requested and thus an EGR flow rate from the exhaust to the intake increases (plot 520). In one example, responsive to the indication of intake humidity sensor degradation at time t4, the EGR flow (e.g., EGR flow rate or amount of EGR flowing to the intake passage) may be adjusted based upon an alternative relative humidity estimate (such as an estimate of maximum relative humidity) and not based on the output of the intake humidity sensor which was determined as being degraded, as shown by 520. It will be appreciated that this EGR flow rate may be lower than the EGR flow rate that may have been determined based upon the output of the degraded humidity sensor (as shown at plot 521) in order to reduce the likelihood of condensation formation. In this way, adjusting engine operation after the diagnostic includes adjusting an exhaust gas recirculation (EGR) flow based on the alternate humidity estimate and not based on the output of the humidity sensor.

Turning now to FIG. 6, it shows an example operation map 600 of an engine of a hybrid vehicle performing the diagnostic routine of FIG. 3, and subsequent engine operation. Map 600 includes various engine parameters along the vertical axis, and elapsed time along the horizontal axis. Map 600 depicts engine temperature (e.g. engine coolant temperature) at plot 602 and accelerator pedal position (PP) at plot 604, which is indicative of operator torque demand. Map 600 further depicts an operating mode at plot 606, and the direction of gas flow through the internal combustion engine is shown at plot 608. Fuel delivery to engine cylinders is shown at plot 610, and an absolute engine speed (RPM) is shown at plot 612. Further, exhaust temperature is shown at plot 614, and the output of the humidity sensor positioned in the intake manifold (e.g., intake humidity sensor) of the engine is shown at plot 616. A flag indicative of degradation of the intake humidity sensor is shown at plot 618, and an EGR flow is shown at 620.

Prior to time t1, a cold engine start may occur. The cold engine start may include an engine temperature or engine coolant temperature (plot 602) below a temperature threshold (dashed line 601). Dashed line 601 may correspond with an ambient temperature threshold, below which a cold engine start may be indicated. Prior to time t1, gas flows through the internal combustion engine in a forward direction (plot 608) by operating the internal combustion engine of the hybrid vehicle in a forward direction. Operating the internal combustion engine in the forward direction includes rotating a crankshaft (e.g., crankshaft 40 of FIGS. 1 and 2) of the engine in a forward direction, which also results in gases flowing through the cylinders of the engine, from the intake to the exhaust. Also, prior to time t1, fuel is bring delivered to the cylinders of the engine (plot 610) and as a result, combustion is occurring in the cylinders. Spark may also be delivered to the cylinders of the engine. The exhaust temperature may steadily increase above a lower threshold temperature (dashed line 615) toward an upper threshold temperature (dashed line 613). The intake sensor positioned in the intake manifold of the engine may be indicating a humidity level (plot 616) approximately equal or equal to ambient humidity (dashed line 619).

At time t1, the controller may recognize a cold start condition that may provide conditions for performing a humidity sensor diagnostic, such as the humidity sensor diagnostic described in FIG. 3. In one example, vehicle and engine conditions may include exhaust temperature (plot 614) below an upper threshold temperature (plot 613) and/or a steady actuation of the accelerator pedal (plot 604) allowing the vehicle to be operated in electric mode. At t1, a humidity sensor diagnostic, such as the humidity sensor diagnostic of FIG. 3, may be initiated. This may include beginning to monitor the humidity sensor response with respect to one or more thresholds. Also at time t1, a parameter of the vehicle may be adjusted in order to reduce the exit of combusted gases and water vapor from exiting the exhaust system using one or more of the methods previously described. And, while the vehicle is being propelled using a battery (e.g., battery 75 of FIG. 1) and not the engine, the engine may be operated according to the humidity sensor diagnostic without affecting the operator's driving experience.

Between time t1 and t2, which may be known as a first duration D1, the controller may send a control signal to an actuator of the starter motor or motor generator in order to crank the internal combustion engine in a forward direction (dashed plot 605). Further, controller may send a command signal to an actuator of the fuel system (e.g., fuel system 208 of FIG. 2) in order to deliver fuel to one or more fuel injectors (e.g., fuel injector 66 of FIGS. 1 and 2 and/or fuel injector 67 of FIG. 1) of the cylinder. As a result, gas flows through the internal combustion engine in a forward direction (plot 608) while combusting fuel in cylinders of the engine (plot 610). The engine speed may be steady (plot 612) and greater than an idle speed (dashed line 611). Exhaust temperature may increase gradually (plot 614). The first duration D1 may be defined as time t1-t2, and may be determined based on a number of combustion events (tick marks 607), in one example. The first duration may be based on an amount of time required to generate a threshold amount of water vapor in the exhaust while rotating the engine in the first, forward direction and combusting fuel. In other examples, the first duration may be based upon an exhaust temperature (plot 614), which may gradually increase during the first duration. Specifically, if the exhaust temperature (plot 614) reaches an upper threshold temperature (dashed line 613) the first duration may end. In this example, if exhaust temperature increase above the upper threshold temperature (dashed line 613), the water vapor in the exhaust may evaporate rather than remaining vapor for the duration of the diagnostic). Thus, at time t2, in response to one or more of a threshold water vapor amount being generated, a temperature of the exhaust system reaching an upper threshold temperature, and an ambient temperature reaching a threshold, the first duration may end, wherein fuel and/or spark delivery to the cylinders may end and any active cranking of the engine may stop. In this way, the engine may start to decrease the speed of rotation in a forward direction (plots 508 and 512) toward a zero speed. At time t2, the first duration ends and gas flow through the engine in the first, forward direction (plots 608 and 612) may decrease toward a zero flow. The exhaust temperature may not continue to increase (plot 614).

During the first duration, the humidity sensor positioned in the intake manifold may monitor the level of water vapor in the air entering the intake manifold (plot 616). In the depicted example, the intake humidity sensor may generate an output that is approximately equivalent to ambient humidity (dashed line 619).

Between time t2 and t3 exists a threshold wait duration, which is a duration between running the engine in the forward direction while combusting fuel at the cylinders and running the engine in the reverse direction while not combusting fuel in the cylinders. In one example, the threshold wait duration may be an amount of time needed to allow the engine to stop rotating in the first, forward direction and come to a stop. In this way, the threshold wait duration may comprise a "wind down" of the engine. In another example, the threshold wait duration may additionally or alternatively be an amount of time for decoupling engine components from the engine that may not be operated in reverse (e.g., transmission oil pump and/or air conditioning compressor). It will be appreciated that the threshold wait duration may be just a few seconds. The threshold wait duration (e.g., threshold duration) may be short enough that the exhaust temperature and/or engine temperature does not increase above a temperature level where the water vapor produced during the first duration D1 evaporates. Additionally, the threshold wait duration may be short enough to prevent an excess amount of exhaust gas entering the sealed exhaust system.

At time t3, gas begins flowing through the internal combustion engine of the hybrid engine in reverse (plot 608) at an absolute engine speed (plot 612) that may be higher than an idle speed (dashed line 613). At time t3, the vehicle may continue be operated in electric mode (plot 606), which may include an electric motor (such as electric motor 72 of FIG. 1) propelling the vehicle, and not the internal combustion engine of the vehicle. However, the internal combustion engine may be operated, as shown by dashed plot 605, for the purpose of the diagnostic at time t3. In this way, flow of gases through the internal combustion engine may be reversed (plot 608) without affecting vehicle performance. As previously described, reversal of gas flow through the engine may be achieved using a plurality of methods, including but not limited to, reversing the rotation of the crankshaft of the engine or reversing the rotation of the camshaft without reversing the crankshaft. In this way, the method includes stopping combusting fuel and flowing gases through the engine in the second direction within a threshold duration of combusting fuel at the cylinder while flowing gases through the engine in the first direction. Fuel is not delivered to cylinders of the engine (plot 610) between time t3 and t4, which may define a second duration D2. Because fuel (and/or spark) is not being delivered to the cylinders, combustion is not occurring for the second duration D2. The second duration D2 may be based on the amount of time to flow the threshold amount of water vapor from the exhaust system to the intake system and past the humidity sensor positioned in the intake system. In one example, responsive to the controller receiving an indication (e.g., output) from the intake humidity sensor while flowing gases through the engine in the reverse direction that is within a threshold of an expected intake humidity sensor response for a given amount of water vapor, as may be indicated by a look-up table based on the amount of water vapor being passed by the humidity sensor, the controller may send a signal to the actuator (e.g., solenoid) of the starter motor to stop cranking the engine in the reverse direction. In other examples, the second duration may be determined based on a number of engine events (tick marks 609), which may include non-combustion engine (e.g., piston) strokes, in one example. The second duration may be based on a threshold rotational time to flow the generated threshold amount of water vapor past the humidity sensor. In other examples, the second duration may be based upon an exhaust temperature (plot 614), which may gradually decrease during the second duration as combustion is not occurring. Specifically, if the exhaust temperature (plot 614) reaches a lower threshold temperature (dashed line 615) the second duration may end. In this example, if exhaust temperature decreases below the lower threshold temperature (dashed line 615), the water vapor in the exhaust may condense rather than remaining vapor for the duration of the diagnostic). At time t4, the second duration ends, and exhaust gases may stop flowing through the engine in the reverse direction (plots 608 and 612). It will be appreciated that in the depicted example, reversal of the gas flow through the engine may be achieved using any one of the previously mentioned methods.

The humidity sensor continues to monitor the humidity level in the intake manifold (plot 616) during the second duration from time t3-t4. As in the previous example, the humidity sensor may exhibit a degradation mode that includes the sensor being stuck producing a low output value that is unresponsive to changes in actual humidity. Combustion gases (which may include a threshold amount of water vapor) generated between time t1 and t2 and that were "stored" in the exhaust system as a result of sealing the exhaust system, may be flowed in a second, reverse direction from the exhaust passage, through the cylinder, and to the engine intake via rotating the engine in the reverse direction. Responsive to the increase in water vapor passing the intake humidity sensor, the response of the intake humidity sensor is expected to increase between t3 and t4, as shown by dashed plot 617. As a result of being degraded, however, the intake humidity sensor output is unresponsive to the increase in water vapor passing the humidity sensor and does not change (plot 616). The difference between the actual humidity sensor output (616) and the expected humidity sensor output (617) may exceed a threshold, above which may indicate degradation of the humidity sensor.

At t4, the second duration ends and so does the diagnostic. Exhaust gases may stop flowing through the engine in the reverse direction (plots 608 and 612) and a flag indicative of probable degradation of the humidity sensor positioned in the intake manifold may be set (plot 618). Additionally, the engine may continue to operate in electric mode (606). Between t4 and t5, another threshold wait duration may occur.

Between t4 and t5, the operator torque demand remains moderate and steady (plot 604) and so the engine continues to operate in electric mode (606) and the internal combustion engine is not operated (as shown by plots 608, 610, and 612). At time t5, an operator torque demand is received, as indicated by accelerator pedal position (plot 604). In the depicted example, electric mode may not deliver sufficient power to meet the torque request, and so the engine may transition to internal combustion (IC) mode (plot 606) and the internal combustion engine may be restarted. As a result, fuel delivery to the cylinders increases (plot 610), as does the absolute speed of the internal combustion (plot 612). Exhaust temperature may also increase (plot 614).

Shortly after time t6, engine operating conditions may be suitable such that recirculation of exhaust gases (EGR) may decrease emissions and increase fuel economy. In one example, responsive to the indication of intake humidity sensor degradation at time t4, the EGR may be adjusted based upon an estimate of maximum relative humidity, as shown by 620. It will be appreciated that this EGR flow rate may be lower than the EGR flow rate that may have been determined based upon the output of the faulty sensor (plot 621) in order to reduce the likelihood of condensation formation. In this way, adjusting engine operation after the diagnostic includes adjusting an exhaust gas recirculation (EGR) flow based on the alternate humidity estimate and not based on the output of the humidity sensor.

In this way, degradation of a humidity sensor positioned in an intake of an engine may be determined responsive to the output of the humidity sensor while flowing exhaust gases in a reverse direction from the exhaust to the intake, where the exhaust gases were produced during combusting fuel and flowing gases through the engine in a forward direction. For example, degradation of the intake humidity sensor may be determined responsive to an output of the humidity sensor not changing by a threshold amount between flowing gases through the engine in first direction while combusting fuel, and flowing the generated exhaust gases back through the engine, in a second direction, while not combusting fuel. Further, in response to indicating degradation, subsequent engine operation may not be adjusted or determined based on the output of the humidity sensor, but rather an alternate estimate of humidity. In one example, the alternate estimate of humidity may include a maximum humidity level for the current operating conditions. As a result of generating a quantity of water vapor as a result of combustion, and flowing the quantity of water vapor back through the engine and across the humidity sensor in the intake manifold, an expected humidity sensor response may be characterized. The technical effect of diagnosing the humidity sensor in this way is that the intake humidity sensor may be diagnosed without relying on remote humidity sensor indications, or the use of supplemental heaters and temperature sensors. In this way, a robust diagnostic for the intake manifold humidity sensor is provided that reduces the number of engine components to perform the diagnostic, reducing complexity and manufacturing costs.

A method for an engine includes: after an engine-off duration, combusting fuel at cylinders of the engine while flowing gases through the engine in a first direction; switching to flowing gases through the engine in an opposite, second direction while not combusting fuel; during the flowing gases in the second direction, obtaining an output of a humidity sensor positioned in an engine intake; and indicating degradation of the humidity sensor based on the output. In a first example of the method, the method further includes in response to indicating degradation of the humidity sensor, adjusting engine operation responsive to an alternate humidity estimate and not based on the output of the humidity sensor. A second example of the method optionally includes the first example and further includes wherein adjusting engine operation includes adjusting an exhaust gas recirculation (EGR) flow based on the alternate humidity estimate and not based on the output of the humidity sensor. A third example of the method optionally includes one or more of the first and second examples, and further includes wherein flowing gases through the engine in the first direction includes flowing combustion gases generated while combusting fuel from the cylinders to an exhaust passage via rotating the engine in a forward direction and wherein flowing gases through the engine in the second direction includes flowing the combustion gases from the exhaust passage, through the cylinder, and to the engine intake via rotating the engine in a reverse direction. A fourth example of the method optionally includes one or more of the first through third examples, and further includes switching to flowing gases through the engine in the second direction within a threshold duration of stopping combusting fuel at the cylinders and flowing gases through the engine in the first direction. A fifth example of the method optionally includes one or more of the first through fourth examples, and further includes, following the engine-off duration and prior to combusting fuel, adjusting a parameter of a vehicle in which the engine is installed to reduce an amount of water vapor in an exhaust system of the engine from traveling downstream and exiting the exhaust system. A sixth example of the method optionally includes one or more of the first through fifth examples, and further includes wherein adjusting the parameter includes one or more of adjusting a valve positioned in the exhaust system into a closed position to seal the exhaust system from atmosphere and block water vapor from exiting the exhaust system and tilting a suspension of the vehicle to be positioned in a nose-facing downward position. A seventh example of the method optionally includes one or more of the first through sixth examples, and further includes wherein the engine is installed in an autonomous vehicle and further comprising, prior to shutting off the engine and a beginning of the engine-off duration, in response to a request to perform a diagnostic of the humidity sensor, parking the autonomous vehicle in a nose-facing downward position. An eighth example of the method optionally includes one or more of the first through seventh examples, and further includes wherein indicating degradation of the humidity sensor includes indicating degradation in response to the output of the humidity sensor not changing by a threshold amount during flowing the gases in the second direction, and further comprising: in response to the indicating degradation, not adjusting engine operation based on the output of the humidity sensor; and otherwise, adjusting engine operation based on the output of the humidity sensor. A ninth example of the method optionally includes one or more of the first through eighth examples, and further includes wherein the engine-off duration includes the engine being shut down for a period of time that is greater than a threshold time and wherein flowing the gases through the engine in the first and second directions and obtaining the output of the humidity sensor are initiated responsive to each of the engine-off duration and an ambient temperature being below a threshold temperature.

In another example, a method for an engine includes: responsive to an engine-off condition and an ambient temperature less than a temperature threshold: rotating the engine in a first direction while combusting fuel for a first duration; within a threshold duration after the first duration, rotating the engine in an opposite, second direction without fueling the engine; and indicating a condition of a humidity sensor positioned in an intake of the engine, upstream of engine cylinders, in response to a change in output of the humidity sensor during the rotating the engine in the first and second directions. In a first example of the method, the method further includes wherein the first duration is based on an amount of time required to generate a threshold amount of water vapor in the exhaust while rotating the engine in the first direction and combusting fuel, and further comprising, rotating the engine in the second direction for a second duration, the second duration based on a threshold rotational time to flow the generated threshold amount of water vapor past the humidity sensor. A second example of the method optionally includes the first example and further includes indicating degradation of the humidity sensor in response to the change in output of the humidity sensor being outside a threshold of an expected humidity sensor output, where the expected humidity sensor output is determined based on the threshold amount of water vapor. A third example of the method optionally includes one or more of the first and second examples, and further includes indicating degradation of the humidity sensor in response to the change in the output of the humidity sensor being less than a non-zero threshold, wherein indicating degradation includes one or more of setting a diagnostic flag and alerting a vehicle operator. A fourth example of the method optionally includes one or more of the first through third examples, and further includes: responsive to the indicating degradation of the humidity sensor, adjusting engine operation based on a set upper threshold ambient humidity level and not based on the output of the humidity sensor. A fifth example of the method optionally includes one or more of the first through fourth examples, and further includes, wherein adjusting engine operation includes adjusting an exhaust gas recirculation (EGR) valve based on an EGR flow estimate that is based on the set upper threshold ambient humidity level.

A system for a hybrid vehicle includes an engine including a plurality of cylinders; a crankshaft and an electric motor, each coupled to a transmission of the hybrid vehicle; an intake manifold; a humidity sensor positioned in the intake manifold; and a controller including non-transitory instructions stored in memory for: following the engine being turned off for a threshold duration: adjusting a component of the hybrid vehicle to block water vapor from exiting out an exhaust system of the engine; and while the hybrid vehicle is moving: cranking the engine in a forward direction while combusting fuel at the engine cylinders for a second duration; cranking the engine in a reverse direction while not combusting fuel at the engine cylinders following the second duration; and indicating degradation of the humidity sensor based on a change in output of the humidity sensor during the cranking the engine in the forward direction and the reverse direction. In a first example of the system, the system further includes a starter motor coupled to the crankshaft of the engine, and wherein cranking the engine in a reverse direction includes running the starter motor in a reverse direction. A second example of the system optionally includes the first example and further includes an adjustable suspension system coupled to the hybrid vehicle, and wherein adjusting the component of the hybrid vehicle includes adjusting the adjustable suspension system to tilt a suspension of the hybrid vehicle into a nose-downward position. A third example of the system optionally includes one or more of the first and second examples, and further includes an exhaust tuning valve positioned in an exhaust passage of the exhaust system, and wherein adjusting the component of the hybrid vehicle includes closing the exhaust tuning valve.

In another representation, a method for an autonomous vehicle, includes: in response to a request to perform a diagnostic of a humidity sensor positioned in an intake of an engine of the autonomous vehicle, parking the autonomous vehicle in a nose-facing downward position prior to shutting off the engine; and after the engine has been shut-down for a first threshold duration: combusting fuel at cylinders of the engine while flowing gases through the engine in a first direction; within a second threshold duration of combusting fuel at the cylinders, stopping combusting fuel and flowing gases through the engine in an opposite, second direction; during the flowing gases in the second direction, obtaining an output of the humidity sensor; and indicating degradation of the humidity sensor based on the output.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
after an engine-off duration:
combusting fuel at cylinders of the engine while flowing gases through the engine in a first direction;
switching to flowing gases through the engine in an opposite, second direction while not combusting fuel;
during the flowing gases in the second direction, obtaining an output of a humidity sensor positioned in an engine intake; and
indicating degradation of the humidity sensor based on the output.

2. The method of claim 1, further comprising, in response to indicating degradation of the humidity sensor, adjusting engine operation responsive to an alternate humidity estimate and not based on the output of the humidity sensor.

3. The method of claim 2, wherein adjusting engine operation includes adjusting an exhaust gas recirculation (EGR) flow based on the alternate humidity estimate and not based on the output of the humidity sensor.

4. The method of claim 1, wherein flowing gases through the engine in the first direction includes flowing combustion gases generated while combusting fuel from the cylinders to an exhaust passage via rotating the engine in a forward direction and wherein flowing gases through the engine in the second direction includes flowing the combustion gases from the exhaust passage, through the cylinder, and to the engine intake via rotating the engine in a reverse direction.

5. The method of claim 1, further comprising switching to flowing gases through the engine in the second direction within a threshold duration of stopping combusting fuel at the cylinders and flowing gases through the engine in the first direction.

6. The method of claim 1, further comprising, following the engine-off duration and prior to combusting fuel, adjusting a parameter of a vehicle in which the engine is installed to reduce an amount of water vapor in an exhaust system of the engine from traveling downstream and exiting the exhaust system.

7. The method of claim 6, wherein adjusting the parameter includes one or more of adjusting a valve positioned in the exhaust system into a closed position to seal the exhaust system from atmosphere and block water vapor from exiting the exhaust system and tilting a suspension of the vehicle to be positioned in a nose-facing downward position.

8. The method of claim 1, wherein the engine is installed in an autonomous vehicle and further comprising, prior to shutting off the engine and a beginning of the engine-off duration, in response to a request to perform a diagnostic of the humidity sensor, parking the autonomous vehicle in a nose-facing downward position.

9. The method of claim 1, wherein indicating degradation of the humidity sensor includes indicating degradation in response to the output of the humidity sensor not changing by a threshold amount during flowing the gases in the second direction, and further comprising:
in response to the indicating degradation, not adjusting engine operation based on the output of the humidity sensor; and
otherwise, adjusting engine operation based on the output of the humidity sensor.

10. The method of claim 1, wherein the engine-off duration includes the engine being shut down for a period of time that is greater than a threshold time and wherein flowing the gases through the engine in the first and second directions and obtaining the output of the humidity sensor are initiated responsive to each of the engine-off duration and an ambient temperature being below a threshold temperature.

11. A method for an engine, comprising:
responsive to an engine-off condition and an ambient temperature less than a temperature threshold:
rotating the engine in a first direction while combusting fuel for a first duration;
within a threshold duration after the first duration, rotating the engine in an opposite, second direction without fueling the engine; and
indicating a condition of a humidity sensor positioned in an intake of the engine, upstream of engine cylinders, in response to a change in output of the humidity sensor during the rotating the engine in the first and second directions.

12. The method of claim 11, wherein the first duration is based on an amount of time required to generate a threshold amount of water vapor in the exhaust while rotating the engine in the first direction and combusting fuel, and further comprising, rotating the engine in the second direction for a second duration, the second duration based on a threshold rotational time to flow the generated threshold amount of water vapor past the humidity sensor.

13. The method of claim 12, further comprising indicating degradation of the humidity sensor in response to the change in output of the humidity sensor being outside a threshold of an expected humidity sensor output, where the expected humidity sensor output is determined based on the threshold amount of water vapor.

14. The method of claim 11, further comprising indicating degradation of the humidity sensor in response to the change in the output of the humidity sensor being less than a non-zero threshold, wherein indicating degradation includes one or more of setting a diagnostic flag and alerting a vehicle operator.

15. The method of claim 14, further comprising responsive to the indicating degradation of the humidity sensor, adjusting engine operation based on a set upper threshold ambient humidity level and not based on the output of the humidity sensor.

16. The method of claim 15, wherein adjusting engine operation includes adjusting an exhaust gas recirculation (EGR) valve based on an EGR flow estimate that is based on the set upper threshold ambient humidity level.

17. A system for a hybrid vehicle, comprising:
an engine including a plurality of cylinders;
a crankshaft and an electric motor, each coupled to a transmission of the hybrid vehicle;
an intake manifold;
a humidity sensor positioned in the intake manifold; and
a controller including non-transitory instructions stored in memory for:
following the engine being turned off for a threshold duration:
adjusting a component of the hybrid vehicle to block water vapor from exiting out an exhaust system of the engine; and
while the hybrid vehicle is moving:
cranking the engine in a forward direction while combusting fuel at the engine cylinders for a second duration;

cranking the engine in a reverse direction while not combusting fuel at the engine cylinders following the second duration; and indicating degradation of the humidity sensor based on a change in output of the humidity sensor during the cranking the engine in the forward direction and the reverse direction.

18. The system of claim 17, further comprising a starter motor coupled to the crankshaft of the engine, and wherein cranking the engine in a reverse direction includes running the starter motor in a reverse direction.

19. The system of claim 17, further comprising an adjustable suspension system coupled to the hybrid vehicle, and wherein adjusting the component of the hybrid vehicle includes adjusting the adjustable suspension system to tilt a suspension of the hybrid vehicle into a nose-downward position.

20. The system of claim 17, further comprising an exhaust tuning valve positioned in an exhaust passage of the exhaust system, and wherein adjusting the component of the hybrid vehicle includes closing the exhaust tuning valve.

\* \* \* \* \*